United States Patent [19]
Holmes et al.

[11] Patent Number: 6,134,432
[45] Date of Patent: Oct. 17, 2000

[54] SYSTEM AND PROCESS FOR ALLOWING WIRELESS MESSAGING

[75] Inventors: Hudson Holmes, Lawrenceville, Ga.; Rob Munro, Auckland, New Zealand; Rich Hall, Alpharetta, Ga.; Jason Kerr, Christchurch, New Zealand

[73] Assignee: Bulletin.net, Inc., Alpharetta, Ga.

[21] Appl. No.: 09/098,614

[22] Filed: Jun. 17, 1998

Related U.S. Application Data

[60] Provisional application No. 60/050,008, Jun. 17, 1997, and provisional application No. 60/062,107, Oct. 14, 1997.

[51] Int. Cl.[7] ...................................................... H04M 1/64
[52] U.S. Cl. ......................... 455/412; 455/465; 455/31.3; 455/413; 379/67.1; 379/88.15
[58] Field of Search .................................... 455/466, 556, 455/557, 31.3, 32.1, 412, 413, 414; 340/825.44; 379/93.24, 93.01, 100.08, 88.12, 88.15; 370/312, 313

[56] References Cited

U.S. PATENT DOCUMENTS

| | | |
|---|---|---|
| 4,969,184 | 11/1990 | Gordon et al. . |
| 5,351,235 | 9/1994 | Lahtinen . |
| 5,436,960 | 7/1995 | Campana, Jr. et al. . |
| 5,438,611 | 8/1995 | Campana, Jr. et al. . |
| 5,479,472 | 12/1995 | Campana, Jr. et al. . |
| 5,487,100 | 1/1996 | Kane . |
| 5,557,320 | 9/1996 | Krebs ........................................ 348/12 |
| 5,561,703 | 10/1996 | Arledge et al. . |
| 5,568,536 | 10/1996 | Tiller et al. . |
| 5,579,472 | 11/1996 | Keyworth, II et al. .................. 395/326 |
| 5,590,133 | 12/1996 | Billström et al. . |
| 5,604,788 | 2/1997 | Tett . |
| 5,608,786 | 3/1997 | Gordon . |
| 5,625,670 | 4/1997 | Campana, Jr. et al. . |
| 5,631,946 | 5/1997 | Campana, Jr. et al. . |
| 5,706,211 | 1/1998 | Beletic et al. . |
| 5,714,943 | 2/1998 | Rasor .................................. 340/825.44 |
| 5,726,984 | 3/1998 | Kubler et al. . |
| 5,742,668 | 4/1998 | Pepe et al. . |
| 5,793,762 | 8/1998 | Penners et al. . |
| 5,796,394 | 8/1998 | Wicks et al. ............................. 345/329 |
| 5,812,865 | 9/1998 | Theimer et al. . |
| 5,970,122 | 10/1999 | LaPorta et al. ......................... 379/67.1 |
| 6,014,429 | 1/2000 | LaPorta et al. ........................ 379/88.15 |

*Primary Examiner*—Reinhard J. Eisenzopf
*Assistant Examiner*—Duc Nguyen
*Attorney, Agent, or Firm*—Smith, Gambrell & Russell, LLP

[57] ABSTRACT

The present invention provides a bi-directional (and/or uni-directional) multiplexing messaging gateway for wireless devices, such as for devices using the Global System for Mobile Communication (GSM) wireless digital standard, or any other suitable protocols. Electronic messages may be transmitted over a wireless connection to, or to and from, a mobile phone, and the present invention maintains and facilitates all necessary housekeeping functions. For example, electronic messages addressed to a mobile phone may be received by the gateway of the present invention from the Internet, a LAN, or any other source, and routed to the appropriate mobile phone. Such electronic messages may be originated manually or may be automatically generated by specific computer applications, such as a scheduling program operating on a LAN. Likewise, the user of the mobile phone may reply to the sender of the original electronic message, whereby the gateway of the present invention maintains the address of the sender and matches it with the reply so as to facilitate the forwarding of the reply to the correct address. Finally, the user of the mobile phone may cause an electronic message received from a sender to be remotely routed to, for example, a chosen facsimile machine, or any other suitable destination.

7 Claims, 21 Drawing Sheets

SYSTEM AND PROCESS FOR ALLOWING WIRELESS MESSAGING

This application claims priority to Provisional Application Serial No. 60/050,008, which was filed on Jun. 17, 1997 and Provisional Application Serial No. 60/062,107, which was filed on Oct. 14, 1997.

BACKGROUND OF THE INVENTION

1. Field of the Invention

The present invention relates generally to a system for providing wireless messaging, and specifically to a system for providing bidirectional wireless electronic mail.

2. Description of the Prior Art

Short Message Services are provided by operators of wireless communication systems today who have digital service available. Short Message Services, or more simply put "SMS", are messages delivered by the wireless network to a digital phone. There are three major digital standards commonly deployed throughout the US today; Code Division Multiple Access ("CDMA"), Time Division Multiple Access ("TDMA"), and Global Systems for Mobile ("GSM").

Global Systems for Mobile ("GSM") is a specification that was written to provide a unified digital platform that all 12 countries of the European Community ("EC") could use from one country to the next with the same phone. Other countries outside of the EC have adopted GSM as their preferred system specification increasing the volume of systems worldwide. The first systems went commercial in 1993 in Europe, while the first commercial GSM system in the United States went commercial at the end of 1995.

GSM is similar to IS-54 TDMA (see below) in that it uses FDMA to separate RF carriers and TDMA to serve up to 8 users per channel. It was developed to provide a single European standard and to facilitate many new enhanced services and automatic roaming. Initially, GSM used the 900 Mhz band but has now added two compatible standards: DCS1800 at 1.8 Ghz and PCS1900 at 1.9 Ghz. TDMA (or D-AMPS) began life as a digital upgrade to the 800 Mhz AMPS network and is commonly referred to as IS-54. It employs the 30 kHz AMPS channel split into three timeslots with a separate control channel. The standard was upgraded to IS-136 to include an integrated digital control channel and interband operability to 1900 Mhz. CDMA was developed to provide further capacity enhancements over the TDMA standards. It uses Direct Sequence Code Division Multiple Access to differentiate users on the same 1.28 Mhz frequency band. CDMA systems are currently operating at 800 Mhz and 1900 MHz.

The US and other countries also decided that there was enough demand for wireless services in the marketplace to introduce more competitors into each market. The amount of new competitors has varied from country to country, but they have consistently used the higher frequency band in the 1900 MHz band. This new license area is generally known as Personal Communication Services ("PCS"), and six new licensed providers have been introduced in each market throughout the US. The two existing operators are generally referred to as "Cellular" operators and operate in the 800 MHz band throughout the US.

SUMMARY OF THE INVENTION

The present invention provides a bi-directional (and/or uni-directional) multiplexing messaging gateway for wireless devices, such as for cellular devices using the Global System for Mobile Communication (GSM) wireless digital standard, or any other suitable protocols. Electronic messages may be transmitted over a wireless connection to, or to and from, a mobile phone, and the present invention maintains and facilitates all necessary housekeeping functions. For example, electronic messages addressed to a mobile phone may be received by the gateway of the present invention from the Internet, a LAN, or any other source, and routed to the appropriate mobile phone. Such electronic messages may be originated manually or may be automatically generated by specific computer applications, such as a scheduling program operating on a LAN. Likewise, the user of the mobile phone may reply to the sender of the original electronic message, whereby the gateway of the present invention maintains the address of the sender and matches it with the reply so as to facilitate the forwarding of the reply to the correct address. Finally, the user of the mobile phone may cause an electronic message received from a sender to be remotely routed to, for example, a chosen facsimile machine, or any other suitable destination.

DETAILED DESCRIPTION OF THE INVENTION

Figure 1:
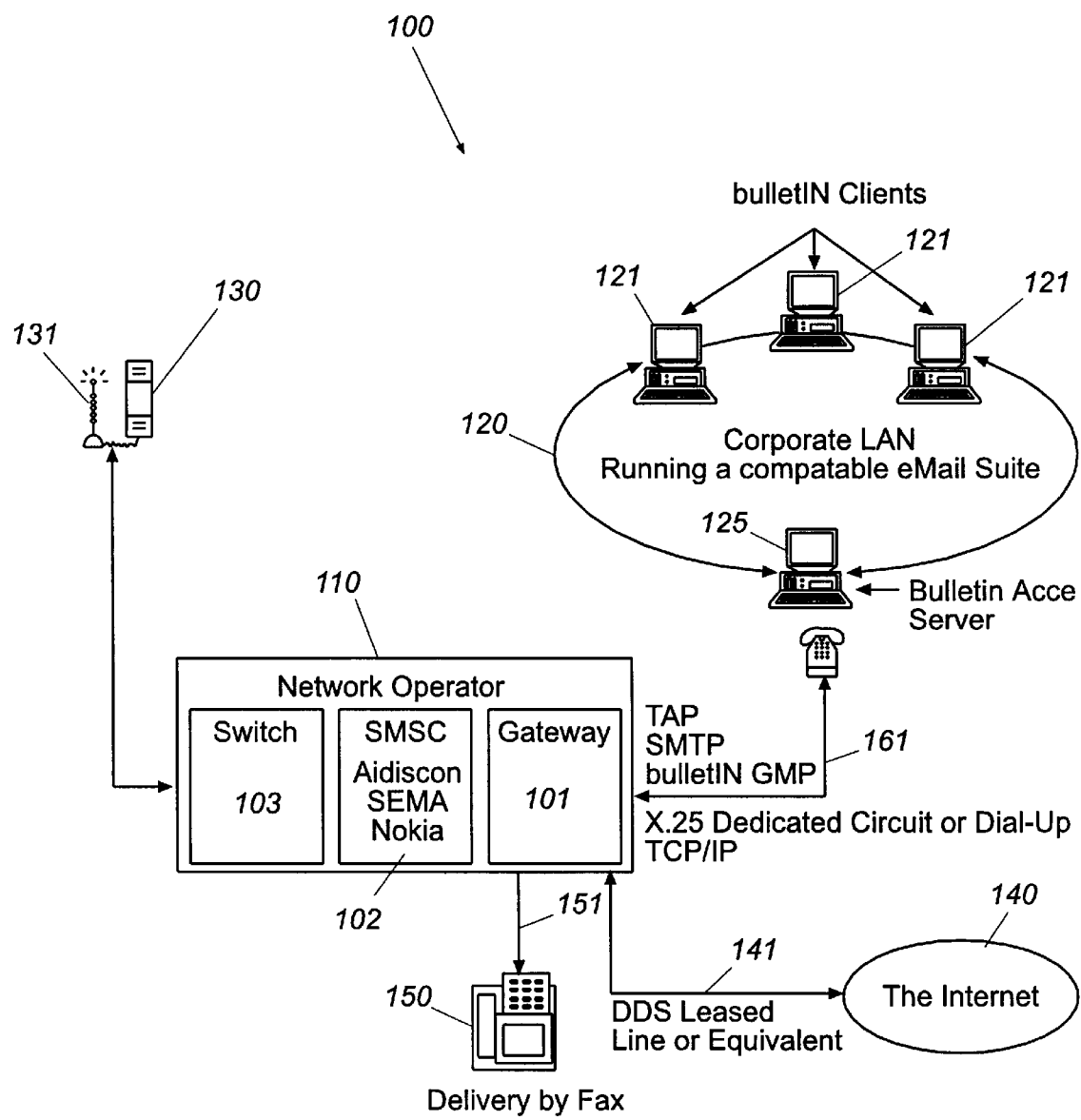
FIGS. 1–3 are block diagrams depicting various components of the present invention.

A preferred embodiment of the invention is now described in detail. Referring to the drawings, like numbers indicate like elements throughout the views.

1. Overall System

In one embodiment, the present invention may be implemented as a Unix-based messaging gateway for Global System for Mobile Communications ("GSM") network operators. Of course, any other suitable communication protocol may be used as well, such as Code Division Multiple Access ("CDMA"), Time Division Multiple Access ("TDMA"), or the like. FIG. 1 depicts an overall functional diagram showing the main components that may be utilized in implementing the present invention.

With reference to FIG. 1, an overall configuration 100 is shown. The network operator components 110 may include a standard Short Message Service Center (SMSC) 102 module as well as a switch 103 for communicating to and from the transmission towers 131, and hence the mobile phones 130. The functionality performed by the present invention may be included within the gateway 101, which may also form part of the network operator components 110.

In one embodiment, the gateway 101 may comprise software running under the Solaris Unix operating system, running on a Sun SPARC Ultra 2 machine, available from Sun Microsystems. The C++ programming language (such as in the Sun NeoWorkshop) may be used to implement the software to implement the gateway 101, and the user interface may be implemented in Java, the tools for which are also available from Sun. Of course, any other suitable machine, operating system and/or development tools may also be used.

The gateway 101 may be connected to the Internet 140 (and/or other equivalent public or private data network) via line 141, which in one embodiment may comprise a DDS leased line, a standard telephone line, or equivalent, using any type of transport protocol (e.g., TCP/IP, etc.). The gateway 101 may also be connected to a local area network (LAN) 120 via an X.25 dedicated circuit, a dial-up TCP/IP connection, or the like (161), using any type of transport and connection protocol, such as generic bulletin message protocol (GMP), telelocator application protocol (TAP), SMTP, etc. The gateway 101 may be connected to the LAN 120 via an access server 125, which will be described in further detail later.

The gateway 101 may also be connected to a facsimile machine 150, or equivalent communication device, via a variety of communication mechanisms 151, such as via a standard telephone line, etc.

Figure 2:
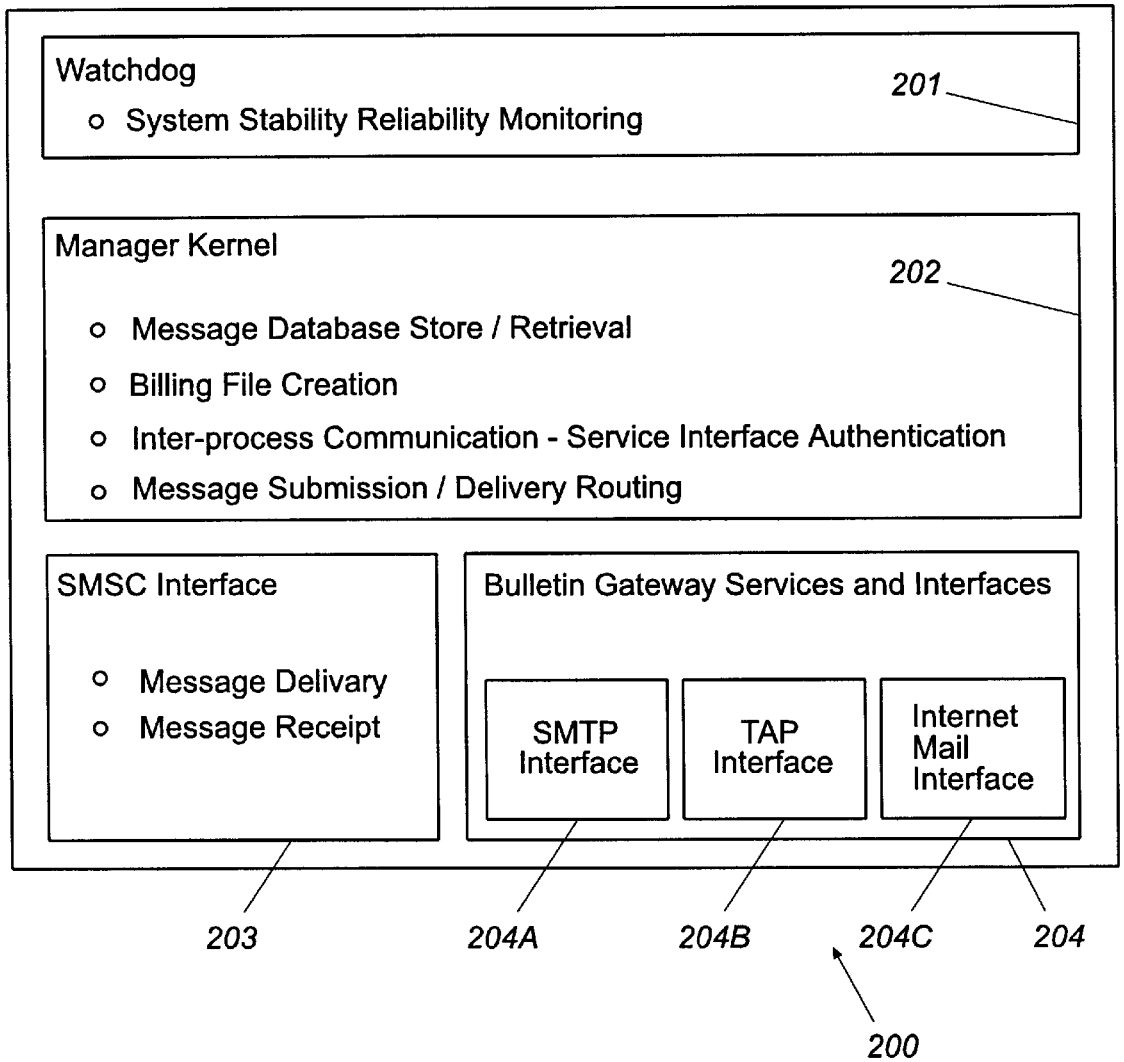

The kernel of the gateway 101 component of FIG. 1 comprises 3 main daemon processes, or subsystems, depicted in FIG. 2. In addition to the service interfaces 204 (described further later), the kernel processes are:

1. Manager 202. Provides database connectivity, message queue management, billing interface, and client authentication.
2. SMS 203. Manages interaction with the SMSC 102 via a communications protocol (e.g. SMPP for Aldiscon SMS systems, over the X.25 or TCP/IP transport protocol).
3. Watchdog 201. Ensures that all kernel processes are functioning correctly, which involves constant monitoring of the state of the process to ensure maximum system up time.

The Gateway Services and Interface subsystems 204 comprise 5 separate and distinct processes, which are usually transient in duration and started on demand by the operating system services. The service subsystems are:

1. SMTP Interface 204A. This service provides the core client message submission services. All client and Internet mail (e.g., from the Internet 140, LAN 120, etc.) eventually use this service to submit messages to the messaging kernel 200.
2. TAP/PET Interface 204B. This service provides a pager protocol interface for message submission, allowing paging terminals, and switches to send to GSM mobile phones 130.
3. POP3 Interface. Although not specifically shown in FIG. 2, POP3 is a protocol component of Internet mail, and is used by clients to retrieve Internet mail from a Server. This service is used by the LAN access server 125 for message retrieval.
4. Internet Mail Interface 204C. This service allows normal Internet e-mail (from 140) to be forwarded to, for example, a digital mobile phone 130, and allows for messages to be composed and sent from a mobile phone 130 to the Internet.
5. X.25 Conversion Interface. In one embodiment of the present invention, there are two available transmission layers supported: x.25 and TCP/IP. While the TCP option is primarily referred to in the present specification, it will be understood that X.25 may be used as well. The X.25 service provides a translation layer to allow incoming X.25 based connections to use the TAP, SMTP and POP3 facilities provided by the other subsystems.

Figure 3:
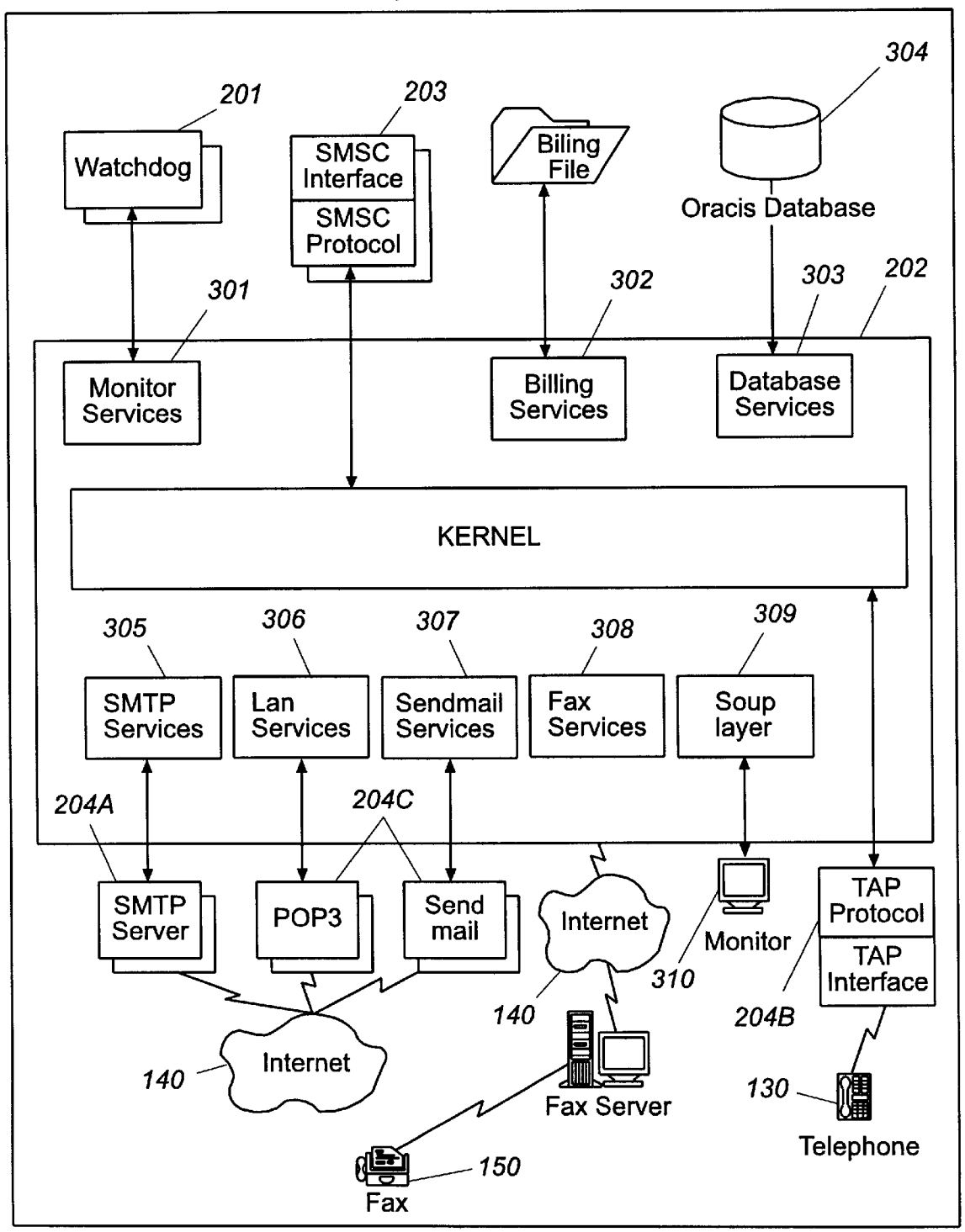

The various components of FIG. 3 will now be described:

Monitor Services 301. This service provides a periodic signal to the watchdog process to indicate system health. The interval is programmable at initialization.

Billing Services 302. This service is part of the Manager process 202. After all successful messages transfers through the gateway 101, a billing record is added to the current billing file. If no file has been created, a new billing file, with the current date and time is created and the billing record recorded.

Database Services 303. This service provides the interface layer for the external datastore 304. This is accomplished using a library of embedded SQL, such as those provided by Rogue Wave Inc. All access to database objects is via the Rogue Wave Library.

Oracle Database 304. An Oracle Workgroup database is used for all datastore, including short term queues and long term message store. Access is achieved via embedded SQL calls.

SMTP Services 305. This service provides the interface layer between the manager process 202 and the SMTP Server (204A).

LAN Services 306. This service provides the interface layer between the manager 202 and the POP3 server 204C. The POP3 server is used by the LAN access server 125 to retrieve messages from the mobile phone 130 destined for the LAN clients 121.

Sendmail Services 307. This service provides the interface layer between the sendmail application that is used to send Internet emails from the gateway 101, and the manager process 202.

Fax Services 308. This service provides the interface layer between the manager process 202 and the Fax Server application. Fax messages are formed as a system command to a remote computer that hosts the Fax Server application.

Soup Layer 309. This service provides the interface layer between the manager process 202 and the Java based application that is used to provide screens used to configure and control the gateway application 101.

2. Addressing Schemes

One important feature of the gateway system 101 is its ability to route messages both from the LAN 120 and/or the Internet 140 to the mobile phone 130, and from the mobile phone 130, back to the LAN 120 or Internet 140 again. To accomplish this, the gateway 101 uses the concept of addressing schemes. Addressing schemes are used to resolve the inherent differences in the addressing between computer based mail systems, and mobile phones.

On a computer mail system (e.g., on LAN 120), individual users 121 are assigned an identifier (usually their name and home domain) which other clients 121 can use to send mail to them. Mobile phones 130 however only use numbers to identify other phone users. To simplify sending messages between mail clients 121 and mobile phones 130, the gateway 101 of the present invention can use a number of addressing schemes and methods to determine the recipient.

Messages sent from a computer based mail system to a mobile phone 130 require a valid MSISDN (mobile phone number), and the UNIX domain name where the gateway 101 resides. For example, a valid MSISDN/domain name address might be "[Error! Bookmark not defined.] 6421200300@sms.domain.com", where the number "6421200300" identifies the MSISDN, and "sms.domain-.com" identifies the Unix domain name of the gateway 101.

However, according to the teachings of the present invention, messages sent from a mobile phone to a destination (LAN 120, Internet 140, etc.) may be addressed using a number of different methods. When a message is sent from an outside e-mail source to a mobile phone 130, the gateway 101 may create a new, temporary and unique reply MSISDN number associated with the reply address, before sending the message and the reply MSISDN number onto the mobile phone 130. If the user of the mobile phone 130 replies to this message, the reply MSISDN number is sent with the reply message back to the gateway 101, which the gateway 101 can map back onto the e-mail address of the original sender—either an Internet mail address or some other type of client ID. Thus, the user of the mobile phone 130 can reply to messages without knowing the address of the original sender—the gateway 101 performs all necessary mapping.

For messages originating from the mobile phone 130, and not using the reply function, there are two methods available for determining delivery. If the message is destined for the Internet 140, the full Internet address of the recipient may be specified in the body of the message. The mobile phone 130 then transmits the message to the gateway 101 using a selected Internet mail relay MSISDN, which is a special number for Internet mail only. The gateway 101 is configured such that any message sent to this MSISDN number will be forwarded to the Internet 140, and delivered to the recipient address specified in the body of the message.

Messages destined for a client 121 using the server 125 have two additional addressing options available to them. These options include two addressing schemes called number map addressing and number name map addressing. For corporate LAN e-mail systems, number map addressing requires a permanent MSISDN number be setup for each individual client 121 configured on the system 120. The system administrator for the system 120 assigns an additional 2 to 4 digit default ID that is tagged onto the permanent MSISDN when messages are sent. These number ranges are used to identify the destination client 121 to receive the message. Only a portion of the overall number is used—the remainder is used by the client 121 to identify the individual user within the client mail system 120. For example, if the Gateway client ID prefix is "642100200", and the client mail user default ID is "01", then the full originating address would be "6410020001"—this address is what would be used to reply to messages, and to originate mobile phone based messages to the client mail system.

For Internet e-mail and number map addressing, incoming Internet messages may be assigned MSISDN numbers on an ad-hoc basis from a pool of available numbers. This temporary MSISDN is stored with the source address of the Internet mail, and is used if the message is replied to. All numbers in this temporary MSISDN pool may be reused in oldest first date order. For example, suppose a message comes in from the Internet to a mobile number "6421605600". It may be addressed as "642160500@sms-.bulletin.net" from "anyperson@anothercompany.com". The gateway 101 assigns a new temporary MSISDN for the life of the message (e.g., "64210010011234") and saves the originating address with this temporary MSISDN. When a reply from the mobile phone comes back, the destination address "6421001001234" is matched to the Internet address of the original message sender. This address ("[Error! Bookmark not defined.]anyperson@anothercompanycom") is then used to transmit the message reply.

Using the number name map addressing scheme with the server 125 only requires the Gateway client ID prefix to be used when transmitting the message from the mobile phone 130. This will identify the client 121 to receive the message. Using an "aliasing facility" in the access server 125 (described in further detail later), the client 121 can then use a simple address like John, or 123 in the body of the message to identity the intended recipient. For example, if the gateway client ID prefix is "642100200" and the LAN mail user is "johnsmith", the message would be received on the mobile phone 130 as from "johnsmith". Messages sent to the LAN 120 from the mobile phone 130 would have to be addressed as "TO johnsmith <message body>" and "+642100200" entered as the destination phone number, when requested by the phone.

Using the number name map scheme with the Internet 140 requires the mobile phone user 130 to address the Internet destined message in the body of the message to identity the intended recipient. Once the message is address to the intended recipient, the message is sent to a predefined, and known MSISDN. This number is referred to as a relay number. Messages to this number are checked by the gateway 101 and the destination address is obtained from the body of the message. Given that some mobile phones 130 cannot produce the @ character, substitutes like * and $ can be used. As an example, suppose the Gateway Internet mail relay number is "6421900900" and the Internet mail destination is "[Error! Bookmark not defined.] johnsmith@somecompany.com". The message would be received from the mobile addressed to the MSISDN "6421900900". The body of the message would contain the address "johnsmith*somecompany.com".

3. Gateway 101 Object Implementation

The gateway 101 may be programmed using standard object-oriented programming techniques. A description of the various gateway 101 objects, and classes used to define the objects, is provided below.

A. Basic System Classes

The basic system classes are a set of "utility" classes used by many of the main server object classes. There are 2 timer classes. One is based on the timer services provided by the native operating system, which provides second based granularity. The other is a time of day trigger class, used to tie specific actions to a particular time of day. The period timer class and time of day class are defined below in Tables 1 and 2:

TABLE 1

| Period Timer Class |
|---|
| Object Attributes |
| • Interval: Timer delay in seconds.<br>• Start Time: Timer start time. |
| Object Methods |
| • Get/Set methods for all attributes.<br>• Has Expired: Checks whether the timer has expired.<br>• Reset: Resets the start time to the current time. |

TABLE 2

| Time of Day Class |
|---|
| Object Attributes |
| • Day: Which day that time is set for.<br>• Time: Time of day in seconds |

TABLE 2-continued

Time of Day Class

Object Methods

• Get/Set methods for all attributes.
• Has Expired: Checks whether the timer has expired.

The thread class provides an object-oriented interface to the native operating system lightweight processes, or thread interface. All classes using threads will utilize this class. The thread class is defined below in Table 3.

TABLE 3

Thread Class

Object Attributes

• Status: Threads current status (running or stopped).
Object Methods

• Start/Stop: Starts or stops the running thread.
• Run: The actual 'worker' method of the thread.

B. Core System Services Objects

The Core System Services Objects are a group of persistent server processes. These processes provide the implementations for the core service objects. These objects provide the primary and essential services for the gateway server 101. The core system service objects and their containing processes are described below.

Each server process has one parent object, which is created at the same time the process is created. This object is responsible for the global "process" initialization, termination and any specific initialization or termination on any of the other server objects. This object also checks the health of the server objects. Any problems are reported to the admin server. The watchdog timer 201 functionality is depicted in FIG. 3 In one embodiment, error conditions are reported with the return from function calls. There is not a timer implemented in the code for process health. Each process maintains a text log file of all debug and diagnostic information for this server process and its' contained objects. The detail of information produced is controlled by an operating system environment variable. The server parent object is defined below in Table 4.

TABLE 4

Server Parent Object

Object Attributes

• Health Timer: Period timer used to monitor process health.
• Process Log: A log file for all server process objects to log dialogue, and debug information.
Object Methods

• Initialize: Perform any process global initialization functions.
• Terminate: Perform any process global termination functions.
• LogMessage: Logs a diagnostic or debug message to the per-process log file.

The intrinsic data objects, or object datum, are a group of shared C++ objects. They exist purely as the fundamental datum from which the core gateway 101 object services are built. The objects are often passed from object to object and service to service, and generally exist independent of the server process or object instantiation. These object datum are not necessarily fine grained, and therefore pass by reference semantics should be used when passing them from object to object.

The message object datum contains the details of an individual message. This object is defined below in Table 5.

TABLE 5

Message Object

Object Attributes

• Source Address: Full Internet address of sender.
• Destination Address: MSISDN of destination.
• Message Text: Contents of the message.
• Priority: An integer value indicating the priority of the message.
• DateTime: When the message was received by Bulletin Gateway.
• Validity: How long before the message expires.
• Status: Message status information.
• Bill Rating: The billing method to be applied to this message.
Object Methods

• Get/Set Methods for all attributes.

The MSISDN object datums contain the MSISDN (described elsewhere). The MSISDN object is defined below in Table 6.

TABLE 6

MSISDN Object

Object Attributes

• Source ID: Object ID of the sender object.
• Destination ID: Object ID of the destination object.
• MSISDN: The actual MSISDN of this object.
Object Methods

• Get/Set methods for all attributes.

The notification object datums are passed from one object to another to inform the target object of some external event (e.g., parameter change, subsystem outage, object termination, etc.). The notification object is defined below in Table 7.

TABLE 7

Notification Object

Object Attributes

• Serial ID: An ID unique to the source object.
• Source ID: Object ID of the sender object.
• Destination ID: Object ID of the destination object.
• Time stamp: When the notification was created.
• Notice: The actual notification code or data.
• Additional Data: Any extra data.
Object Methods

• Get/Set methods for all attributes.

The Request object is used by the various processes to obtain data from the manager process 202. The request object is defined below in Table 8.

TABLE 8

Request Object

• Serial ID: An ID unique to the source object.
• Source ID: Object ID of the sender object.
• Destination ID: Object ID of the destination object.

TABLE 8-continued

Request Object

• Time stamp: When the request was created.
• Request: The actual request code or data.
• Require Ack: Whether this request requires an acknowledgment.

Acknowledgment object datums are sent in response to a request. The acknowledgment should contain the serial ID of the sender, and be directed back to the source object. The acknowledgement object is defined below in Table 9.

TABLE 9

Acknowledgement Object

Object Attributes

• Serial ID: The id of the original request/notification object.
• Source ID: Object ID of the sender object.
• Destination ID: Object ID of the destination object.
• Time stamp: When the acknowledgment was created.
• Complete: Yes or No if the request was completed.
• Reason: Reason if request was not completed.
Object Methods

• Get/Set methods for all attributes.

Association object datums are used to map one data type to another, such as routing table entries and address mappings. The association object is defined below in Table 10.

TABLE 10

Association Object

Object Attributes

• Source ID: Object ID of the sender object.
• Destination ID: Object ID of the destination object.
• Name: The name associated with this data map if any.
• Type: The type of the data map, ie routing entry or address map.
• Map1 Type: The type for the first map datum.
• Map1 Data: The data for the first datum.
• Map2 Type: The type for the second map datum.
• Map2 Data: The data for the second datum.
Object Methods

• Get/Set methods for all attributes.
• AsString: retrieves one map datum, converting it to a string.

The core service object superclass is the base or super class for each of the core service objects. This class provides the interface used for generic object communication such as request, notification and acknowledgment passing. All objects must implement this interface. The core service object superclass is defined below in Table 11.

TABLE 11

Object Attributes

• Transaction Stats: A statistic object updated internally, and periodically requested.
• State: Internal object state - Used for debugging.
Object Methods

• Notify: Send a notification to another object.
• Request: Send a request to another object.
• Acknowledge: Send an acknowledgment to another object.
• Process: Processes any incoming notices, requests, or acknowledgments.

The manager server 202 implements the object interfaces for the message, queue, billing, MSISDN objects. These objects manage all interfaces to the database. All objects in this server process are multi-threaded, with one thread per object instantiation. All objects are generally one instantiation.

The message store object is the most basic and fundamental object in the gateway server 101. This object contains all the logic related to storing and retrieving messages from the data store 304. The message store object is defined below in Table 12.

TABLE 12

Message Store Object

Object Attributes

• Message Store: A reference to the data store object.
Object Methods

• Store: Saves the message to the data store.
• Retrieve: Loads a message from the data store.
• Delete: Removes a message from the data store.
• Archive: Sends message details to the billing object, and then flags the message as sent.

The queue management object maintains the queue tables in the data store. For each new unsent message added to the message store, an entry is created in the queue data store by this object. Messages are retrieved in order of the message priority and submission date.

Message objects are sent to the sms 203 (FIGS. 2–3) for transmission to the SMSC 102 (FIG. 1). Sent messages are placed in a holding data store waiting for a positive acknowledgment. If a message submission is not acknowledged by the receiving transmitter, and the failure was not an unrecoverable error it is placed back into the queue data store. Successfully sent objects are archived back to the message store object.

The queue management object is defined below in Table 13.

TABLE 13

Queue Management Object

Object Attributes

• Queue Datastore: A reference to the data store object.
• MessageQ Cache: One cache per routing table destination.
• Sent Messages: A list of messages waiting to be acknowledged.
• Queue Timer: The master queue timer.
Object Methods

• Next Message: Returns the next available message for transmission.
• Stop/Start Processing: Starts or Stops the automatic timer processing of queue entries.

The billing object handles all aspects of the Call Detail Record (CDR). The CDR is used for the integration of call information from a Switch with the billing system 302 so an operator can supply a detailed bill to end users. When a message has been successfully sent the billing object 302 will be sent the message details. A billing record is then created.

The billing files created are in the same format as the Aldiscon billing file format 2. A description of this billing record may readily be found in the "Aldiscon Short Message Peer to Peer Manual". An example of an Aldiscon billing record is shown below:

"000099C00128C000000000064210100886421010100013290000001C000000000064216325920000000000 0000C980505001344012C000C01600C0C0C000"

The billing object 302 is defined below in Table 14.

TABLE 14

Billing Object

Object Attributes

• Bill Datastore: A reference to the data store object.
Object Methods

• Create CDR: Creates a CDR record from the supplied message.

The sms server object 203 implements the object interfaces for the various sms and paging protocol objects such as Smpp for Aldiscon SMSCs and Sema Open Interface for Sema SMSC's. In either case, the actual object interface remains the same—only the actual implementation details differs.

Messages are forwarded to the sms 203 for transmission via the selected transport protocol. The sms object 203 must then acknowledge all messages as having been successfully sent, failed to send, or un-sendable. The various responses will depend on the response from the SMSC 102 when a submission was attempted. Messages are attempted once only, as retries are handled by the Queue manager object in the manager server 202.

The sms object 203 is also responsible for starting and maintaining the physical link, and any protocol management required by the various SMSCs 102.

The SMS object 203 implements the actual native communication protocol of the host SMSC 102. The current alternatives are SMPP on an Aldiscon SMSC or the Sema Open Interface protocol for a Sema SMSC. The SMS object is defined below in Table 15.

TABLE 15

SMS Object

Object Attributes

• SMS Interface: A communication link to the SMS.
• Unconfirmed Messages: A list of messages sent to the SMSC but not yet confirmed.
• Un-sent Messages: A list of messages received from the router but not yet sent to the SMSC.
Object Methods

• Start/Stop: Starts or stops the link between the object and the SMSC.
• Submit: Submits a message for transmission to the SMSC.
• Receive: Sends a incoming message received from the SMSC to the manager.

Figure 11:
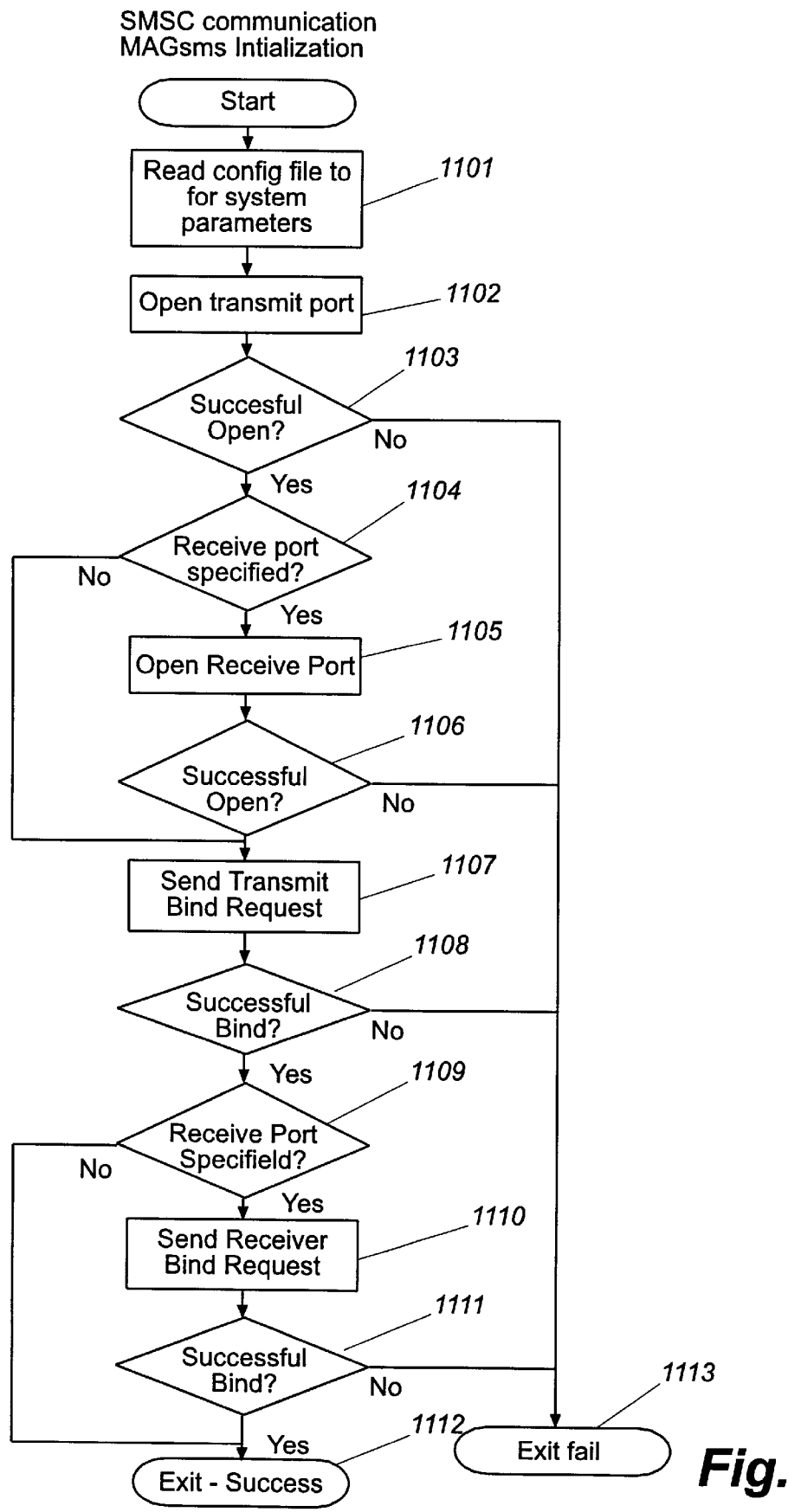

The sms object 203 may be initialized as follows, with reference to FIG. 11. The reference numerals shown below in [brackets] correspond to the associated reference numerals in FIG. 11.

[1101] Read the configuration file and store the system parameters required to log into the SMSC 102. Information includes ports used for transmit/receive, password, username and message type.

[1102] Open the transmit port for communication of messages to the SMSC 102.

[1103] Check for successful transmit port initialization.

[1104] Test for requirement for two-way communication. If two-way, open receive port, otherwise skip to next section (1107).

[1105] Open the receive port for communication of messages from the SMSC 102.

[1106] Check for successful receive port initialization.

[1107] Send bind request to the SMSC 102 for the transmit port. Information includes username, password, message type, etc.

[1108] Check for successful bind. A bind acknowledgement should be received from the SMSC 102 over the specified port.

[1109] Test for requirement for two-way communication. If two-way communication, attempt to bind using the receive port, otherwise skip to the next section (1112).

[1110] Send bind request to the SMSC 102 for the receive port. Information includes username, password, message type, etc.

[1111] Check for successful bind. A bind acknowledgement should be received from the SMSC 102 over the specified port.

[1112] Exit with TRUE, indicating successful bind of the gateway 101 into the SMSC 102.

[1113] Exit with FALSE, indicating unsuccessful bind of the gateway 101 into the SMSC 102.

The admin server implements the object interfaces for the task scheduling, parameters, statistics, and alarm monitoring objects. These objects monitor and check the status of the server as a whole, and provide dynamic access to the runtime parameters.

The task scheduler object manages a list of tasks that need to be run periodically. The tasks may include bill file creation, statistics gathering, and health monitoring. Each task is scheduled either as a period timer, or as a time of day timer. As each task timer expires, a request is sent to the destination object requesting that the task be completed. If a task fails to complete a notification is sent to the alarm object and the task is rescheduled. Task timer details are retrieved from the parameter object. The task scheduler object is defined below in Table 16.

TABLE 16

Task Scheduler Object

Object Attributes

• Task List: The list of tasks.
• Timer List: The list of timers associated with task.
Object Methods

• Start/Stop: Starts or stops the task scheduler.
• Send Task Notice: Sends a task request to an object.
• Send Failure Notice: Sends a task failure notice to the alarm object.

The parameter object maintains the central gateway database of preferences and options. Each object can request the value for a parameter or update its value. The parameter object is also responsible for loading and saving this file. Each individual parameter is stored in the form of a key and value pair. String, numeric, and boolean value types may be supported. The parameter object is defined below in Table 17.

TABLE 17

Parameter Object

Object Attributes

• Parameter List: The list of key/value pairs.
Object Methods

• Save: Saves the values the parameter list to the parameter file.

TABLE 17-continued

Parameter Object

• Load: Loads the Key/Values from the parameter file.
• Get Value: Returns the value for the specified key.

The alarm object responds to alarm notifications from any other object and maintains a health check on all server objects. Any object failure is logged to an alarm log file, and sent to the admin server to be displayed. Alarms are considered active until either a cancel alarm notice is received from the originating object or an acknowledgment is received from a system administrator via the administration tool interface. The alarm object is defined below in Table 18.

TABLE 18

Alarm Object

Object Attributes

• Alarm List: A list of active alarms.
Object Methods

• Open/Close Log: Opens or Closes the alarm log file.
• Acknowledge Alarm: Flags an alarm as acknowledged and removes it from the active alarm list.
• Send Alert: Sends an alarm alert to the admin for display.

The address resolver object takes care of the details of mapping Internet addresses to MSISDN based addresses, as described elsewhere. This mapping is handled by association objects, and the general store object. The address resolver is passed incorrectly addressed messages from the router object. The resolver then either looks up the correct destination address for the destination type (mobile network or Internet) or creates a new mapping for new messages.

The address resolver object has an address range that is used to assign temporary MSISDN-based addresses to outbound Internet messages. This address acts as a source address to the mobile network, and provides a way for the router to find the correct source address if the message is replied to. Source MSISDN addresses, created in real time in this manner, live only as long as it takes to cycle through the complete range of available addresses.

All incoming messages from the mobile network are routed through a requester object. The destination and contents of the message are inspected and compared to a list of delivery services. Delivery services are keyed to a specific 'known' destination address, or to specific instructions contained in the body of the message. For messages sent to a known address, the complete message is forwarded to that service for delivery. Messages containing instructions usually relate to another message, and this second message can be found based on the destination address of the mobile message using the address resolvers source address method. Once this second message is retrieved, the request action can be carried out by the delivery service.

Delivery services consist of an optional "known" address and either an internal delivery mechanism, or a pointer to an external delivery agent. Internal agents are defined as an internal method or set of cooperative methods used to complete the delivery function. Examples of this are a mail delivery agent. External agents are usually defined as an external process or script.

Messages containing instructions are usually in the form of commands. These commands identify the delivery agent, and or any additional instructions to be passed to the delivery agent. These commands can be used to complete complicated instructions, or to spawn a series of commands to complete a function.

An example of this is the FX command which instructs the fax external delivery agent to fax a message to the supplied fax number. Additional commands and agents can be added at any time.

C. Transient System Server Objects

The transient system services objects are a group of non-shared server processes. These processes provide the implementations for the transient service objects. These servers provide the external communications objects for the gateway server 101.

The smtp object 204A (FIGS. 2–3) implements the object interfaces for the SMTP receiver object 305. This object implements the SMTP protocol for external message submission by Internet mail compatible systems.

In the SMTP object 305 is implemented a full server side version of the SMTP protocol as defined in the Internet RFC 821 and succeeding standards documents. This server object is used by both the access server 125 (FIG. 1) and any Internet mail clients for message submission.

Each individual message is validated against the MSISDN database for authority to send, resource limits etc. Therefore as each message is received from the SMTP client, a request to the manager server 202 for the MSISDN verification for that message must be received and checked before any acknowledgment can be sent back to the SMTP client. The MSISDN to be checked is obtained in the RCPT TO: field where the destination will be in the form of "RCPT TO: someuser@somedomain.com". Invalid MSISDN message should be rejected during the SMTP transaction. Accepted messages are then passed to the manager object 202 for transmission.

Internet mail extension headers, referred to as X headers, are used to control certain message properties. Properties controlled by the x headers are Priority, message lifetime or validity, and the billing method to be used. An additional 'service provider' x header is used to identify clients with special privileges or rights.

The SMTP Object is defined below in Table 19.

TABLE 19

SMTP Object

Object Attributes

• Profile List: A list of the most resent MSISDN profiles received.
Object Methods

• Send Message: Sends a message on to the router object for delivery.
• Reject Message: Rejects a message during SMTP transaction.
• Smtp Process: Processes incoming SMTP transactions.

The mail object implements the object interfaces for the POP3 transmitter object (described elsewhere). This object implements the POP3 protocol for external message reception by any Internet mail compatible system.

The POP3 object responds to any incoming POP3 mail requests. POP3 client authentication consists of a username, which is the MSISDN, and a password. Once this has been received from the client the POP3 object gets the MSISDN objects from the manager server 202 to authenticate the transaction. Authenticated sessions can then proceed to receive mail. Any invalid user/password combinations will result in session termination.

After the POP3 client as logged off the successfully sent messages are removed from the message object store.

The POP3 object is defined below in Table 20.

TABLE 20

POP3 Object

Object Attributes

• Sent Messages: A list of successfully sent messages to be deleted.
Object Methods

• Send Message: Sends a message on to the POP3 client object.
• Pop3 Process: Processes incoming POP3 transactions
• End Session: Performs end of session cleanup, such as sent message deletion.

The aim object implements the object interfaces for a generic TCP/IP based protocol for advanced message submission and reception by external applications. The aim object responds to incoming TCP requests on an assigned port. Using the INET service daemon, incoming calls cause the INET daemon to start this process. The object implements a generic 3 phase protocol (bind, transaction, terminate), that perform the same functionality as the SMTP and POP3 protocols combined. Each packet consists of a header and data. Each connecting host must be authenticated in a similar manner to the POP3 authentication—that is MSISDN/password. Once authenticated, the client can proceed with message submission until either side terminates the session. The Aim object will generally only terminate a session if resource limits are exceeded or if a system outage occurs.

The aim object is defined below in Table 21.

TABLE 21

Aim Object

Object Attributes

• Profile List: A list of the most resent MSISDN profiles received.
• Sent Messages: A list of successfully sent messages to be deleted.
Object Methods

• Send Message: Sends a message on to the manager object 202 for transmission.
• Get Message: Allows the client to receive any waiting messages.

The tap object implements the object interfaces for a TAP alphanumeric paging protocol for message submission. The tap object implements a full server side version of the TAP protocol. This interface is for use by any client page submission software. Given that most TAP client software supports direct dial-up connections, supporting a TAP interface would require a modem pool or terminal servers and local points of presence. The TAP interface requires direct management of the client connect and login process, and it is therefore necessary to use the SVR4 service access controller (SAC) facility to manage the connection terminal equipment directly.

With the tap object, each individual message is validated against the MSISDN database for authority to send, resource limits etc. Therefore as each message is received from the SMTP client, a request to the manager server 202 for the MSISDN profile object for that message must be received and checked before any acknowledgment can be sent back to the TAP client. The MSISDN to be check is obtained from the message destination field. Invalid MSISDN message should be rejected during the transaction. Accepted messages are then passed to the router object for transmission.

The tap object is defined below in Table 22.

TABLE 22

Tap Object

Object Attributes

• Profile List: A list of the most resent MSISDN profiles received.
Object Methods

• Send Message: Sends a message on to the router object for delivery.
• Reject Message: Rejects a message during SMTP transaction.
• Tap Process: Processes incoming SMTP transactions.
• Get Profile: Gets a profile from the manager profile store object.

4. Operation of the Gateway 101

FIGS. 4–10 depict the processes performed by the gateway 101 in order to implement the present invention. All the steps shown in these figures reference the various servers and objects they contain using the syntax of<Server process>::<Object Name>. Additionally, the reference numerals shown below in [brackets] correspond to the associated reference numerals in the various figures.

Figure 4:
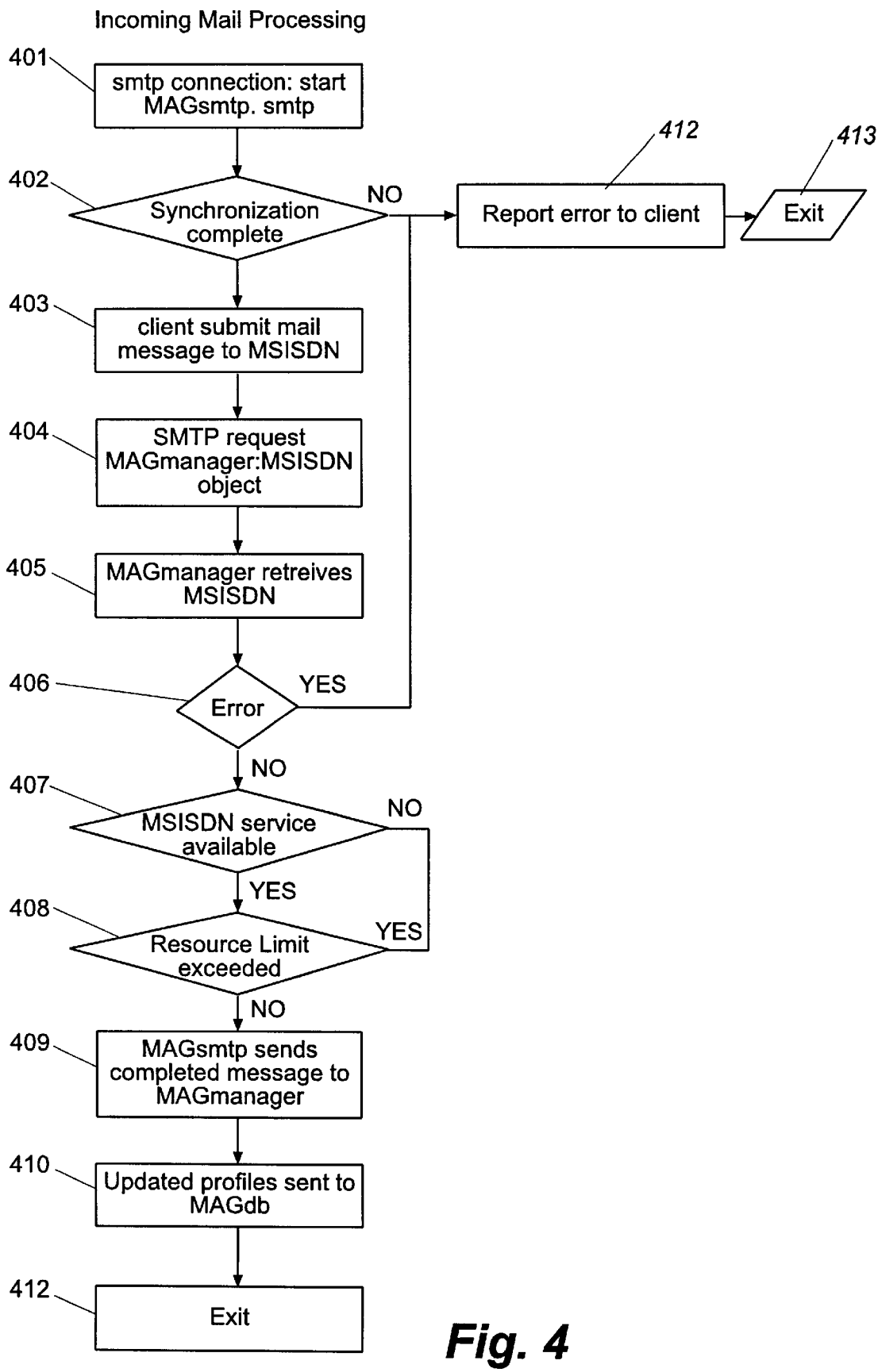
FIGS. 4–21 are flow diagrams depicting the operation of the present invention.

With reference to FIG. 4, a process for submitting a message from a mail client 121 to the router object for transmission is shown, as described below:

[401] SMTP connect request from mail client 121. INET service starts smtp::SMTP object.
[402] smtp::SMTP exchanges SMTP greetings with client 121, and mail transactions begin.
[403] Client 121 submits a mail message to a MSISDN.
[404] SMTP Object requests the MSISDN object from the manager::MSISDN object.
[405] manager::MSISDN retrieves the MSISDN from the MSISDN data store.
[406] manager::MSISDN returns either a success, or an error.
[412–413] On error, smtp::SMTP reports and error to the client.
[407–411] smtp::SMTP sends a complete message to manager::Router for transmission.

Figure 5:
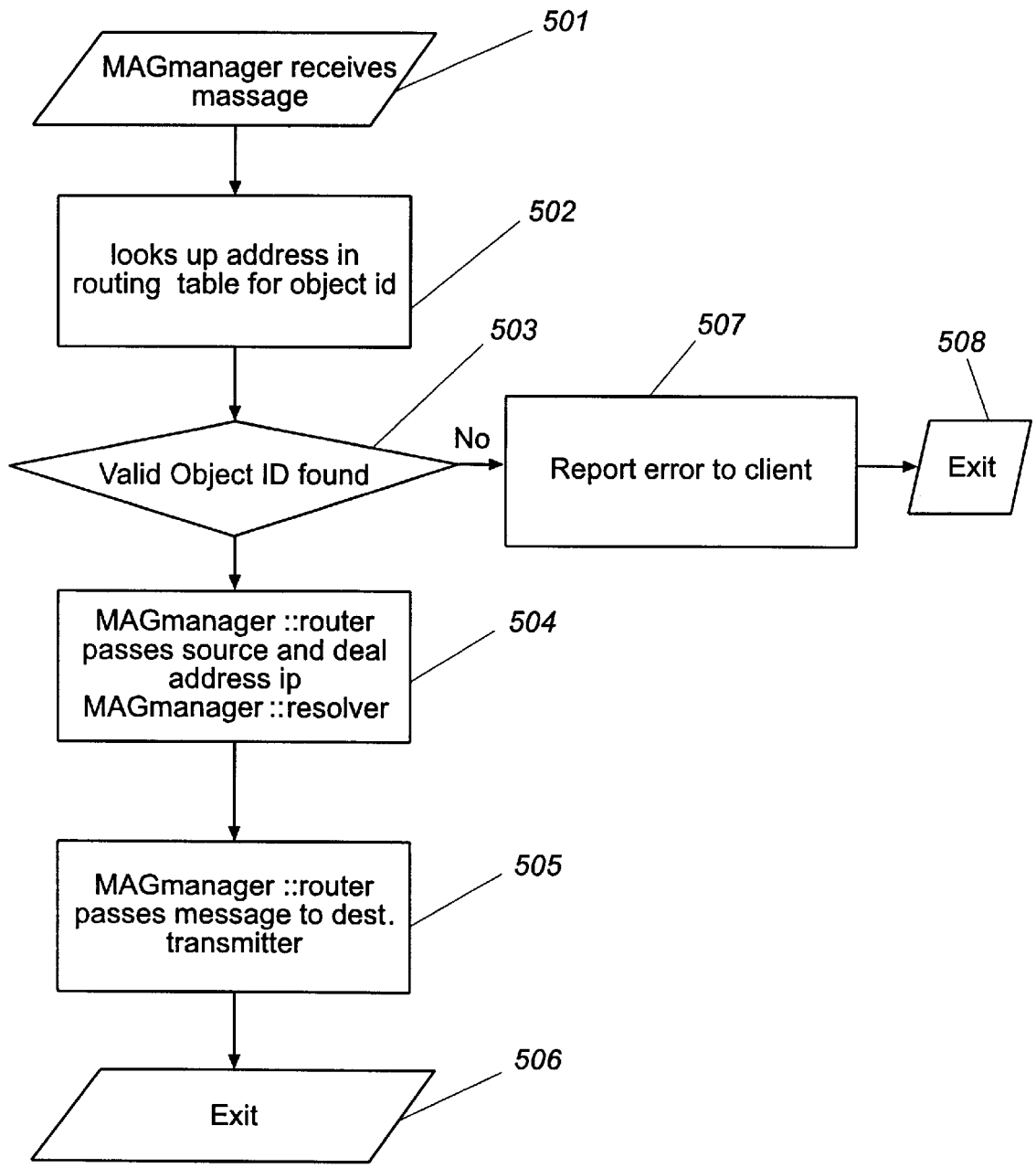

With reference to FIG. 5, a process for routing a message to the destination object for transmission to the final target SMSC 102 is shown, as described below.

[501–503, 507–508] manager::Router receives a message, and extracts the destination address.
[504] manager::Router passes the message to the destination transmitter object.
[504] If the transmission object was not active then manager::Router passes the object to the manager::Qmanager.

Figure 6:
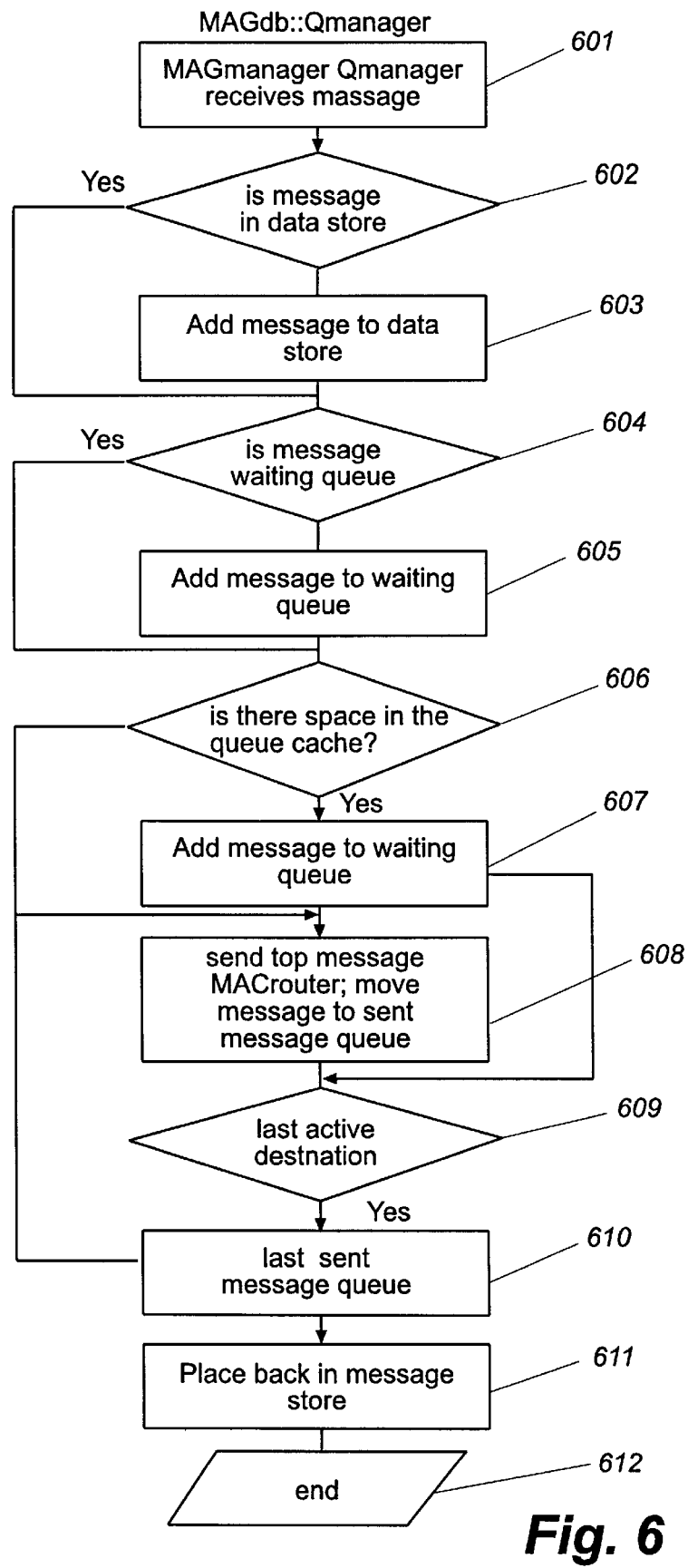

With reference to FIG. 6, the steps described below illustrate the process for maintaining the queue of messages waiting to be sent.

[601–602] manager::Qmanager checks with manager::Message whether the message exists in the data store.
[603] If not manager::Message adds it to the data store.
[604–607] manager::Qmanager adds the message to the waiting queue, if it is not already present. If there are less than the message queue cache size, the message is added to the queue cache for the transmitter object. manager::Qmanager cycles throughout the various queue caches for each queue.
[608–609] manager::Qmanager sends the top message to sms::Router.

[610] manager::Qmanager adds the message to the sent messages cache.

[611] manager::Qmanager checks the timestamps on all entries in the sent message cache. All old entries that have not been acknowledged are placed back in the message store.

Figure 7:
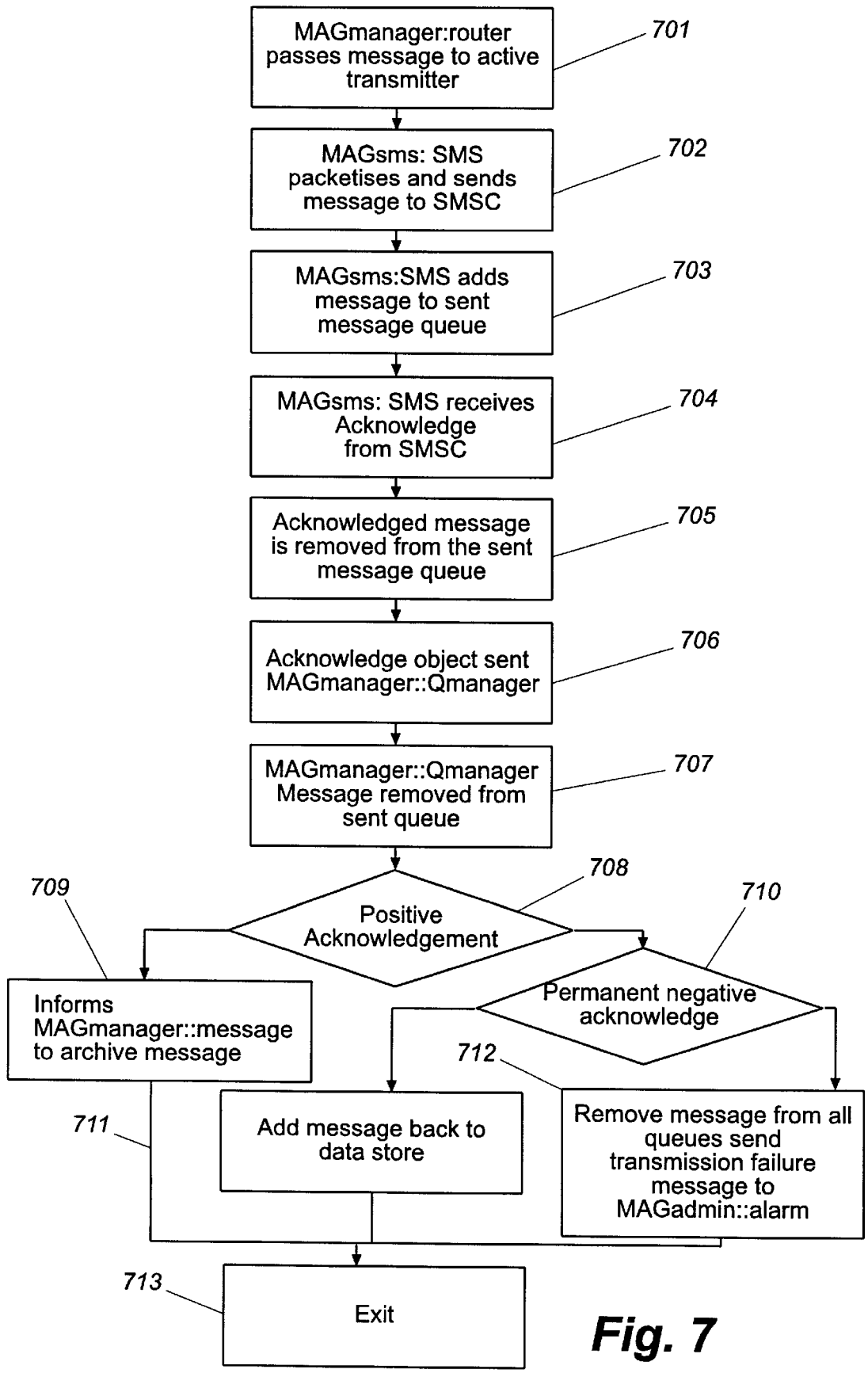

With reference to FIG. 7, the steps described below illustrate the process for transmission of a message to the final destination.

[701] manager::Router passes a message to the designated active (SMS) transmitter.

[702] sms:SMS packetises and sends the message to the SMSC 102.

[703] sms:SMS adds the message to a sent messages queue.

[704] sms::SMS receives an acknowledgment from the SMSC 102.

[705] sms::SMS checks this acknowledgment against the list of sent messages. The matching entry is removed from the sent message cache.

[706] For both positive and negative SMSC acknowledgments an acknowledgment object is created and sent to the manager::Qmanager.

[707] For positive acknowledgements, manager::Qmanager removes the message from the sent queue.

[708–709, 713] manager::Qmanager informs manager::Message that the message can now be archived.

[710–711, 713] For negative acknowledgments manager:: Qmanager will remove the message from the sent messages cache and add it back into the queue data store.

[712–713] If the negative acknowledgment was a permanent one manager::Qmanager removes the message from all queues.

[712–713] manager::Qmanager then passes a request for a "transmission failure" message to admin::Alarm for processing.

Figure 8:
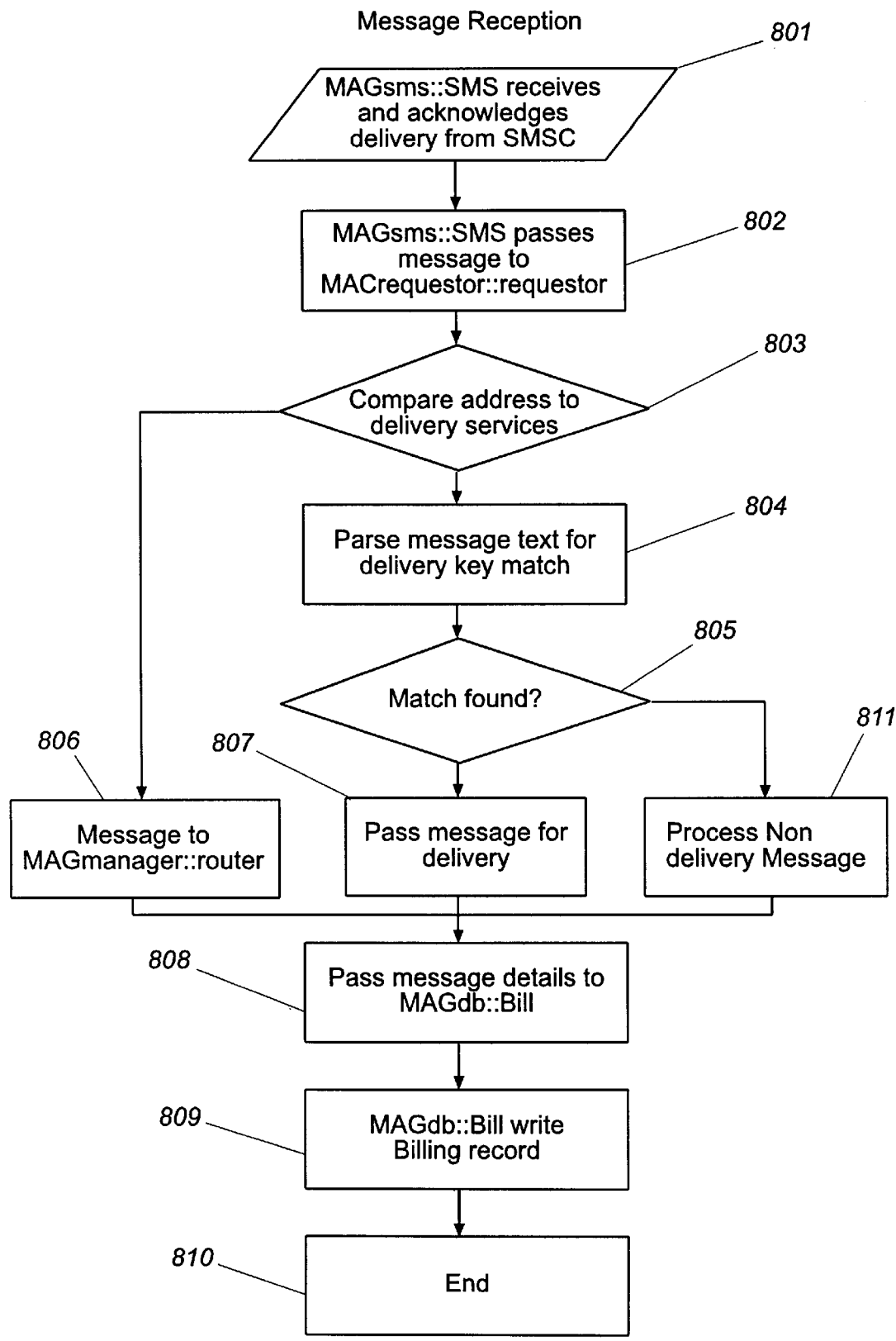

With reference to FIG. 8, the steps described below illustrate the process for receiving a message from the SMSC 102, and performing the required action for final delivery.

[801] sms::SMS receives and acknowledges a delivery request from the SMSC 102.

[802] sms::SMS passes the message to manager:: Reqestor.

[803] manager::Requestor examines the destination address against the list of delivery services.

[803] If there is a match, manager::Requestor passes the message to the delivery agent for processing (806)

[804] If there is no a match on delivery address, manager::Requestor parses the body of the message looking for any text "keys" that match any of the delivery agent keys.

[805] If there is a match manager::Requestor passes the message to the delivery agent for processing (807). Otherwise, to step 811.

[807] Delivery Agent processes message for delivery.

[808] If there was a match on either manager::Requestor passes the message details to manager::Bill.

[809] manager::Bill generates a Call Detail Record (CDR), and passes the message to manager::Message.

[807] manager::Message archives the message in the data store.

[806] If no match was found, manager::Requestor passes the message to manager::Router, where a system "non-delivery" message is generated.

[811] Process non-delivery message.

Figure 9:
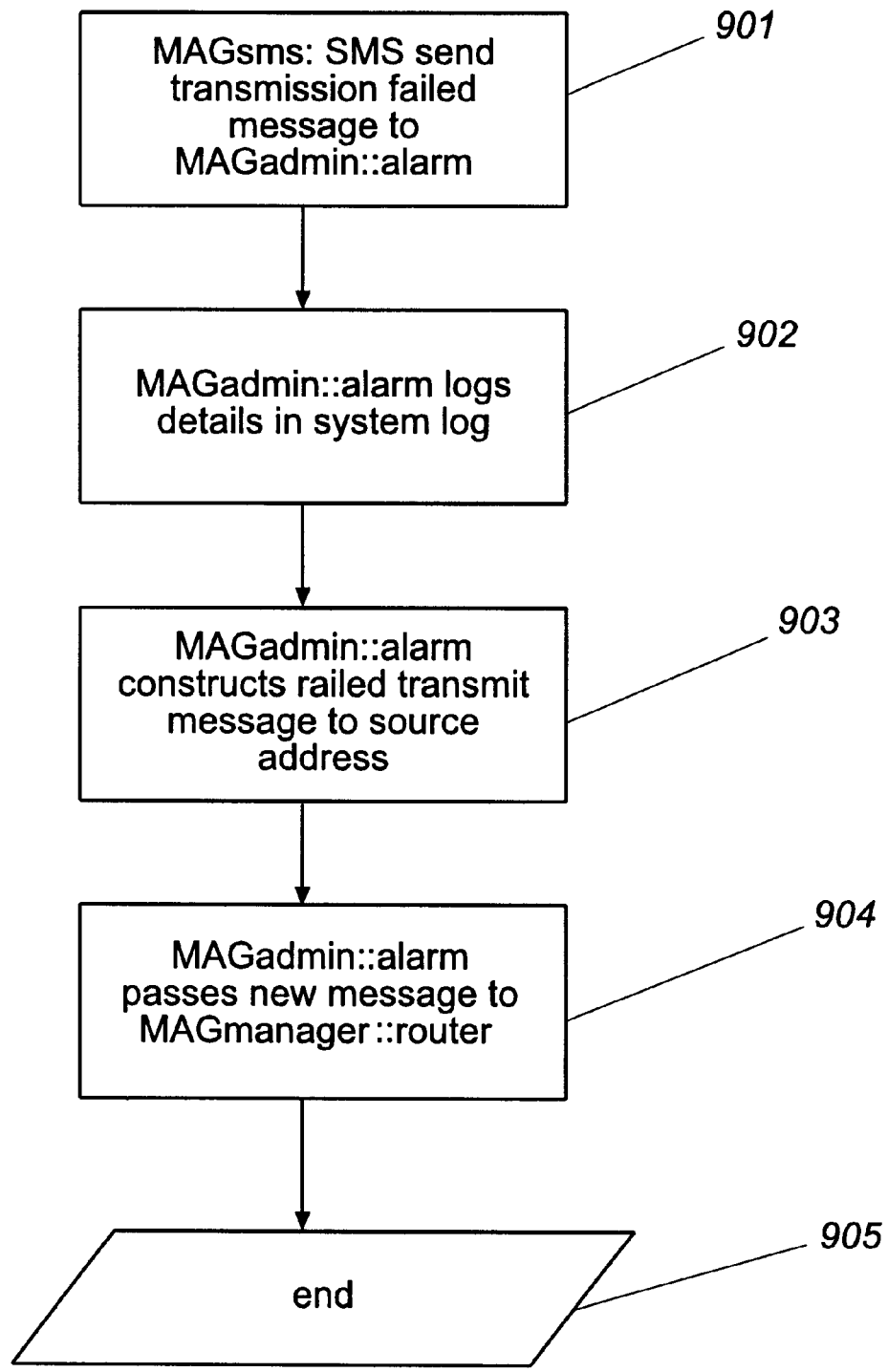

With reference to FIG. 9, the steps described below illustrate the process for transmitting a message destined for the SMSC 102, but which for some reason fails to be transmitted successfully, and the failure is deemed permanent.

[901] sms::SMS sends a 'transmission failed' message to admin::Alarm.

[902] admin::Alarm logs the details of the message failure into the system log.

[903] admin::Alarm constructs a new "failed to transmit" message to the source address of the message.

[904] admin::Alarm passes the new message to manager:: Router to send.

Figure 10:
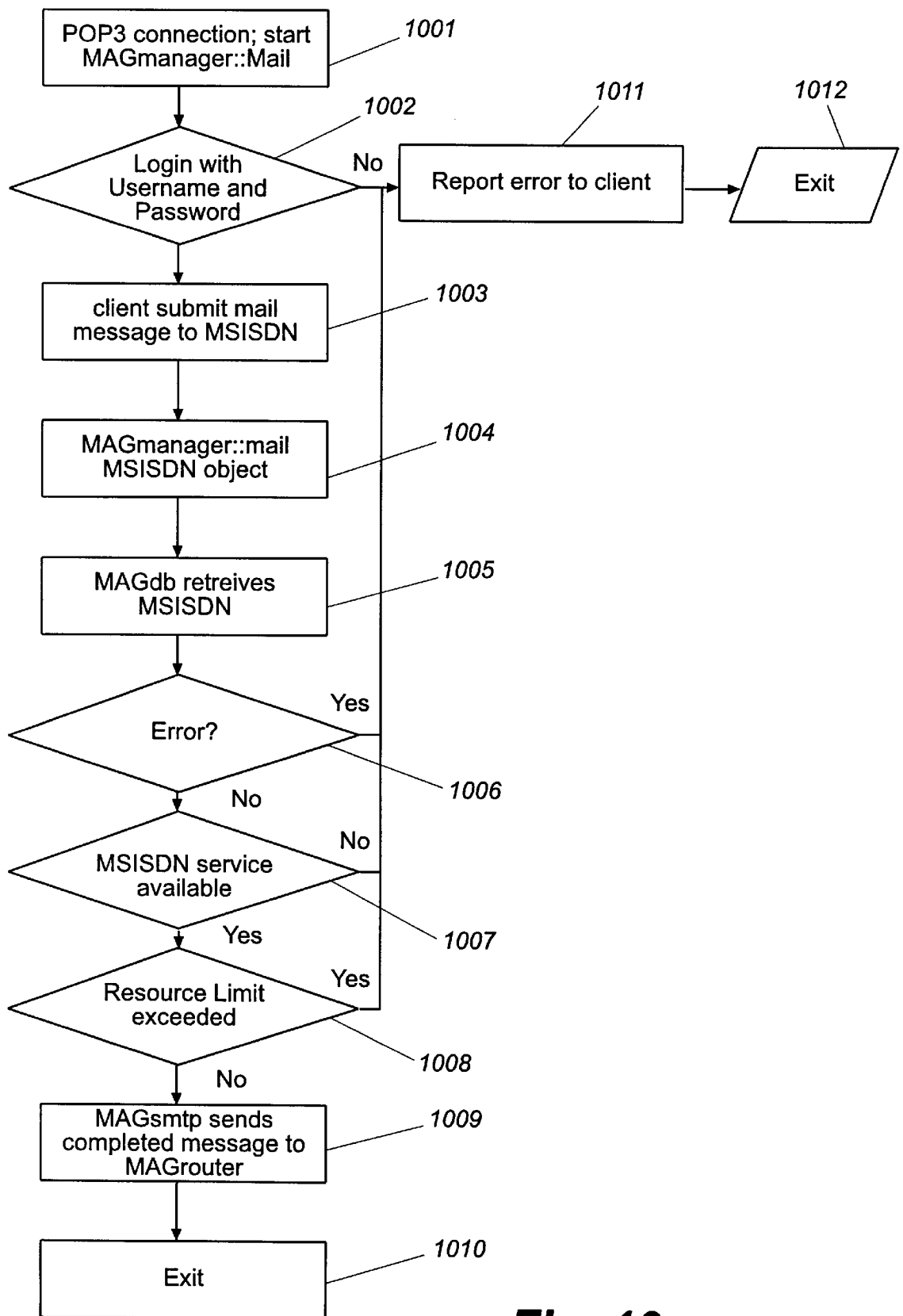

With reference to FIG. 10, the steps described below illustrate the process involved with a client's 121 connection to the gateway 101 to receive waiting messages, or replies.

[1001] POP3 connect request from mail client 121. INET service starts mail::MAIL object.

[1002] mail::MAIL exchanges POP3 username and password with client 121.

[1003–1004] mail::MAIL requests the MSISDN object from the manager::MSISDN object.

[1005–1006] manager::MSISDN retrieves the MSISDN from the MSISDN data store. manager::MSISDN returns either a MSISDN object, or an error. On error mail::MAIL reports and error to the client, and terminates the connection.

[1007–1008] mail::MAIL checks the password and profile for a mail service and resource limitations. If the target MSISDN has a mail service and not exceeded resource limits the transaction proceeds, otherwise an error is returned to the client 121.

[1009–1010] smtp::SMTP sends a complete message to manager::Router for transmission.

5. LAN Access Server 125 and Clients 121

As described previously with respect to FIG. 1, the LAN access server 125 of the present invention provides for the transparent forwarding of e-mail from a client 121 on a LAN 120 to a mobile phone 130 (e.g., a PCS mobile phone) via the gateway 101. Additionally, as a further feature of the present invention, the LAN access server 125 may also interface to, for example, an appointment and task management system (such as Microsoft Scheduler+, or the like) operating on the server 125, LAN 120 and client 121, to provide automatic forwarding of appointment reminders, task reminders, etc., to a mobile phone 130.

In a preferred embodiment, the software applications implemented on access server 125 in order to implement the teachings of the present invention may be complied as 32-bit C++ code to operate with, for example, any of the following operating systems: Windows 95, Windows 98, Windows NT (3.51 and 4.00 Workstation and Server), or equivalent. Of course, any other suitable operating system may also be used. The access server 125 itself may therefore be any suitable hardware platform that supports these or any other chosen operating system. For example, in one embodiment, access server 125 may comprise a Pentium PC (IBM compatible), with the Windows NT 4.0 Workstation Operating System (or equivalent). The software of the present invention that controls the operation of access server 125 may be designed to be compatible with MAPI (Exchange and MS Mail), VIM (Lotus Notes and CCMail), MHS, or any other suitable protocol. Also, the following application programming interfaces (APIs) may be used in one embodiment: Microsoft Foundation Classes, Extended MAPI, Remote Access Server (RAS), Winsock, and Remote Procedure Call (RPC).

With reference to FIG. 1, in one embodiment, the access server 125 and clients 121 operate as three general components in a client/server architecture. The basic components include the access server 125 itself, as well as a client administration tool that operates on a client 121 and a server administration tool that operates on the access server 125. The server 125 and clients 121 may communicate with one another via RPC calls over the LAN 120, such as through the TCP/IP protocol, or any other suitable protocol.

FIGS. 12–21 are flow diagrams depicting the various steps performed by the LAN Access Server 125 in order to process mail between one or more clients 121 of the network 120 and one or more phones 130, through the intervening components (gateway 101, SMSC 102, switch 103, etc.). These figures are described in detail below, and again the reference numerals shown below in [brackets] correspond to the associated reference numerals in the figures.

Figure 12:
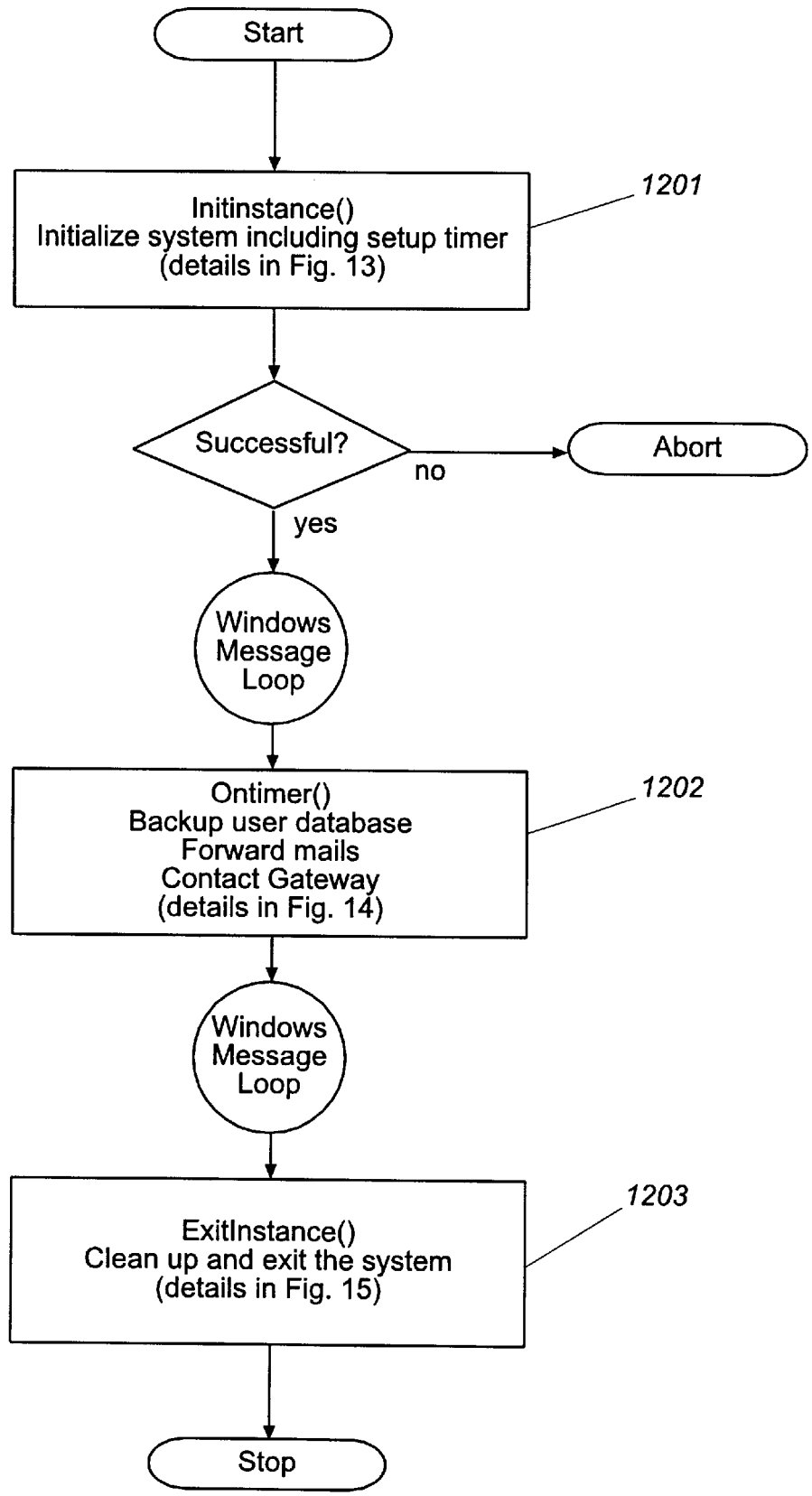

FIG. 12 describes an overall process performed by LAN Access Server 125.

Figure 13:
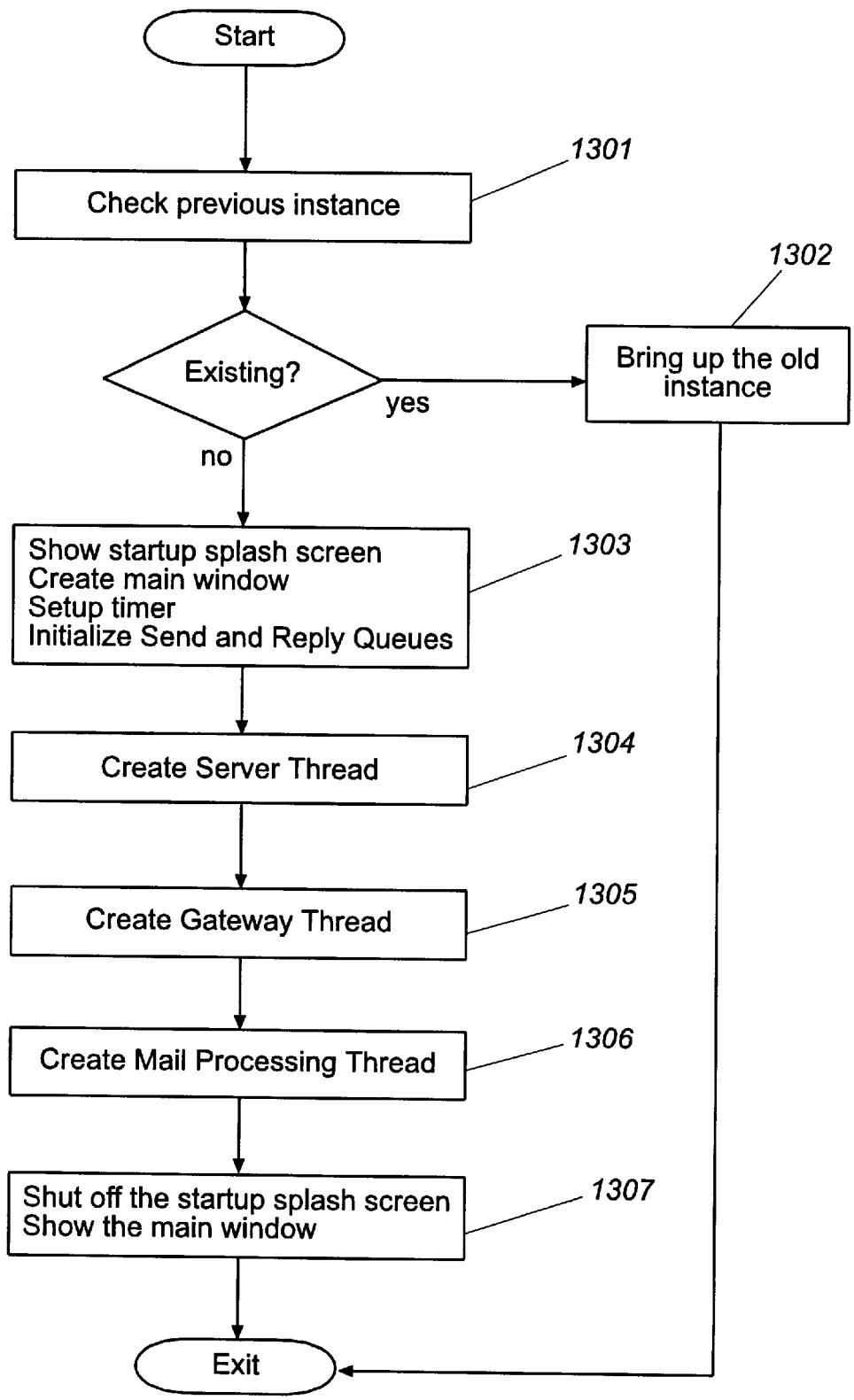

[1201] Initialize the system, including setup of the timer for mail system polling and gateway 101 access (further details in FIG. 13).

[1202] Backup user database, forward e-mails, and contact Gateway 101. This is a main "artery" of the system (further details in FIG. 14).

Figure 15:
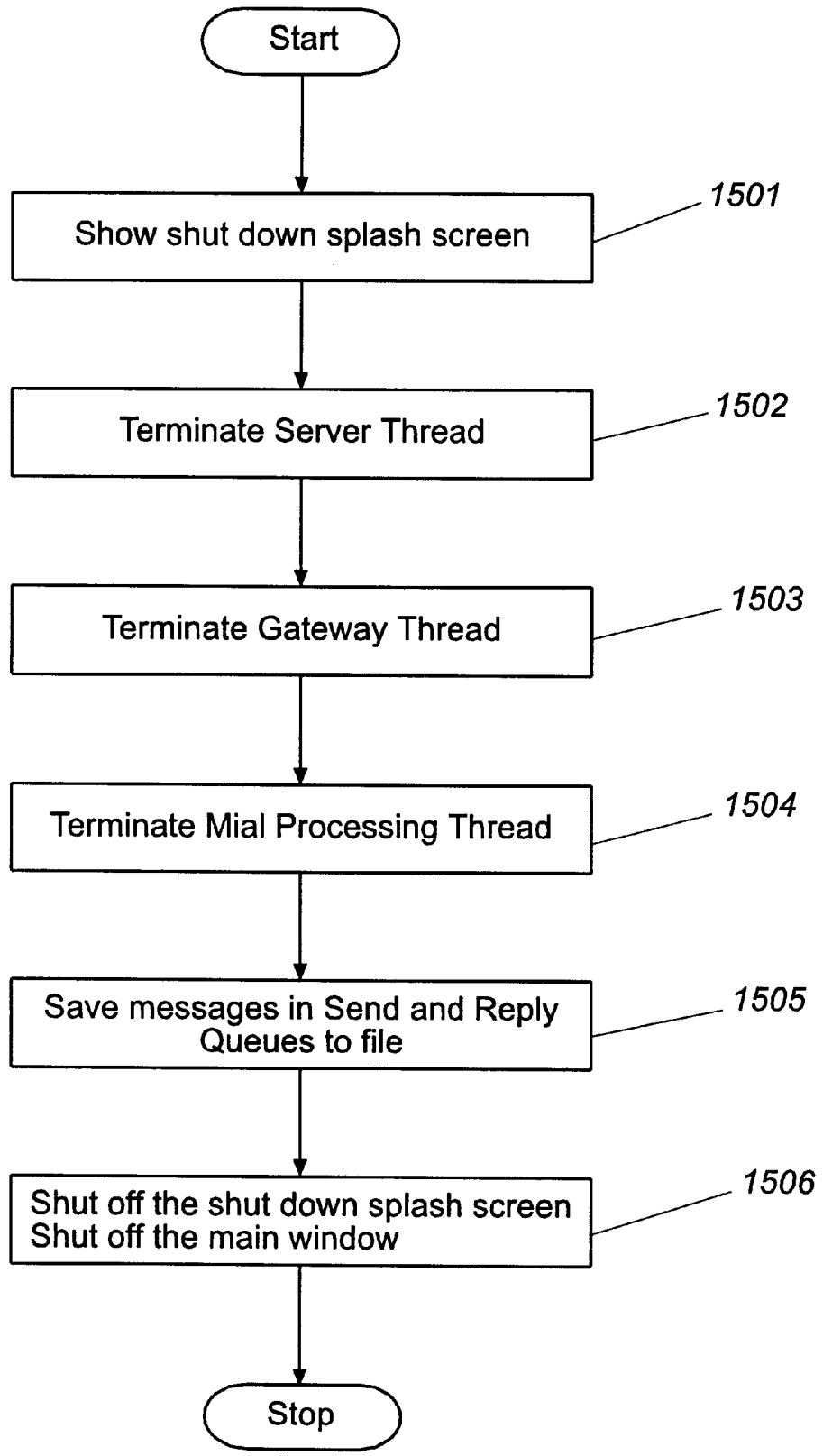

[1203] Clean up and exit the system (further details in FIG. 15)

FIG. 13 depicts the process performed by step 1201, described above with respect to FIG. 12.

[1301] Check previous instance.

[1302] Bring up the old instance.

[1303] On the video display of LAN Access Server 125, show the startup-splash screen, create main window (but not show it), setup the timer, initialize the Send Queue and the Reply Queue.

[1304] Create the Server Thread.

[1305] Create the Gateway Thread.

[1306] Create the Mail Processing Thread.

[1307] Shut off the startup-splash screen, show the main window.

Figure 14:
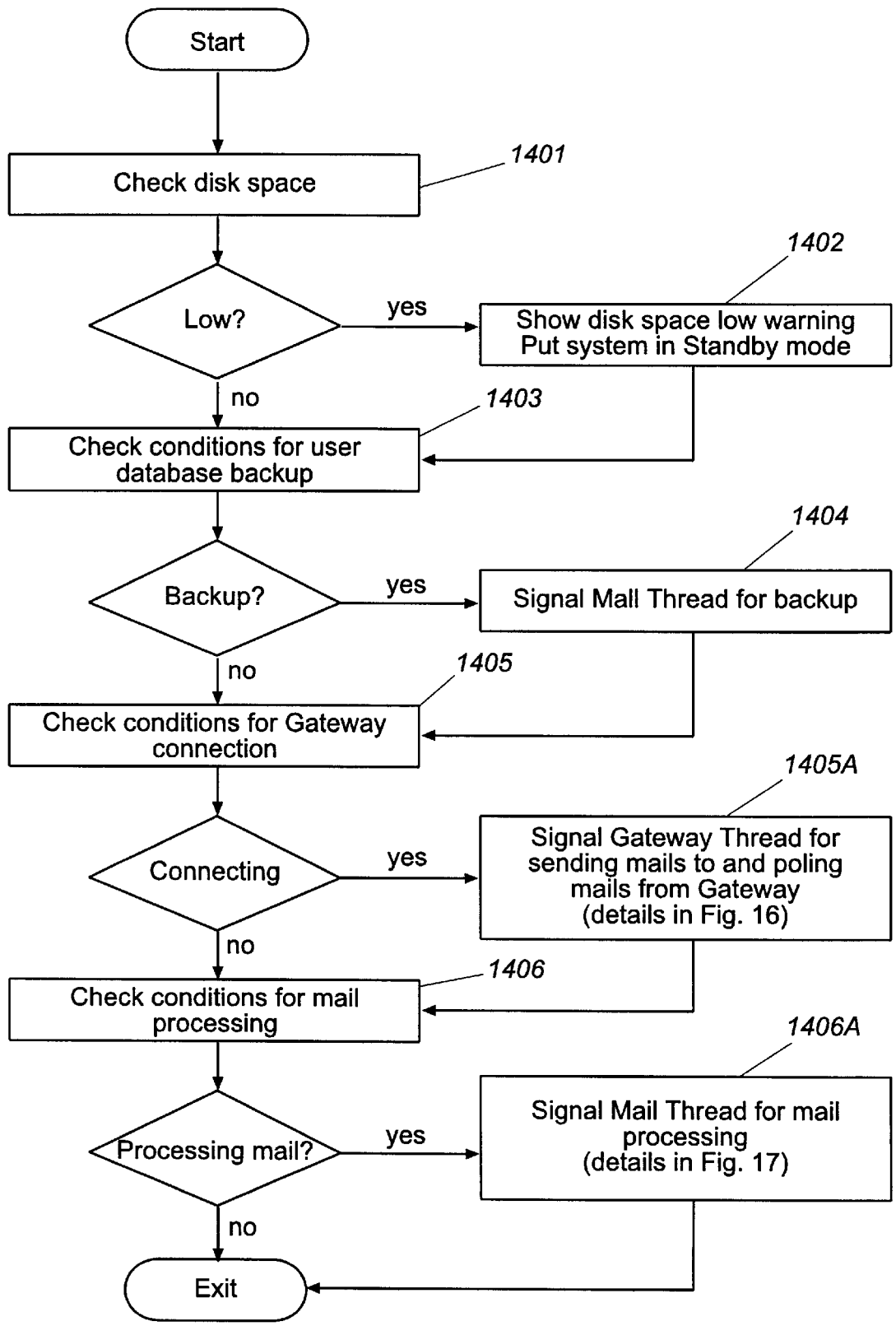

FIG. 14 depicts the process performed by step 1202, described above with respect to FIG. 12.

[1401] Check disk space.

[1402] If low, show a suitable warning and put the program in standby mode.

[1403] Check if it is time to back up the user database.

[1404] If so, send a Windows message to Mail Processing Thread to back up the user database.

[1405] Check if it is time to connect to the gateway 101.

[1405A] If so, then signal gateway thread for sending mail to and polling mail from the gateway 101. This step is described in further detail with respect to FIG. 16.

[1406] Check if it is the time to process mail.

[1406A] If so, then signal mail thread for mail processing. This step is described in further detail with respect to FIG. 17.

FIG. 15 depicts the process performed by step 1203, described above with respect to FIG. 12.

[1501] On the video display of LAN Access Server 125, show the shut down splash screen.

[1502] Stop the Server Thread.

[1503] Stop the Gateway Thread.

[1504] Stop the Mail Processing Thread.

[1505] Save the messages in Send and Reply Queues to a file.

[1506] Shut off the shut down splash screen and the main window.

Figure 16:
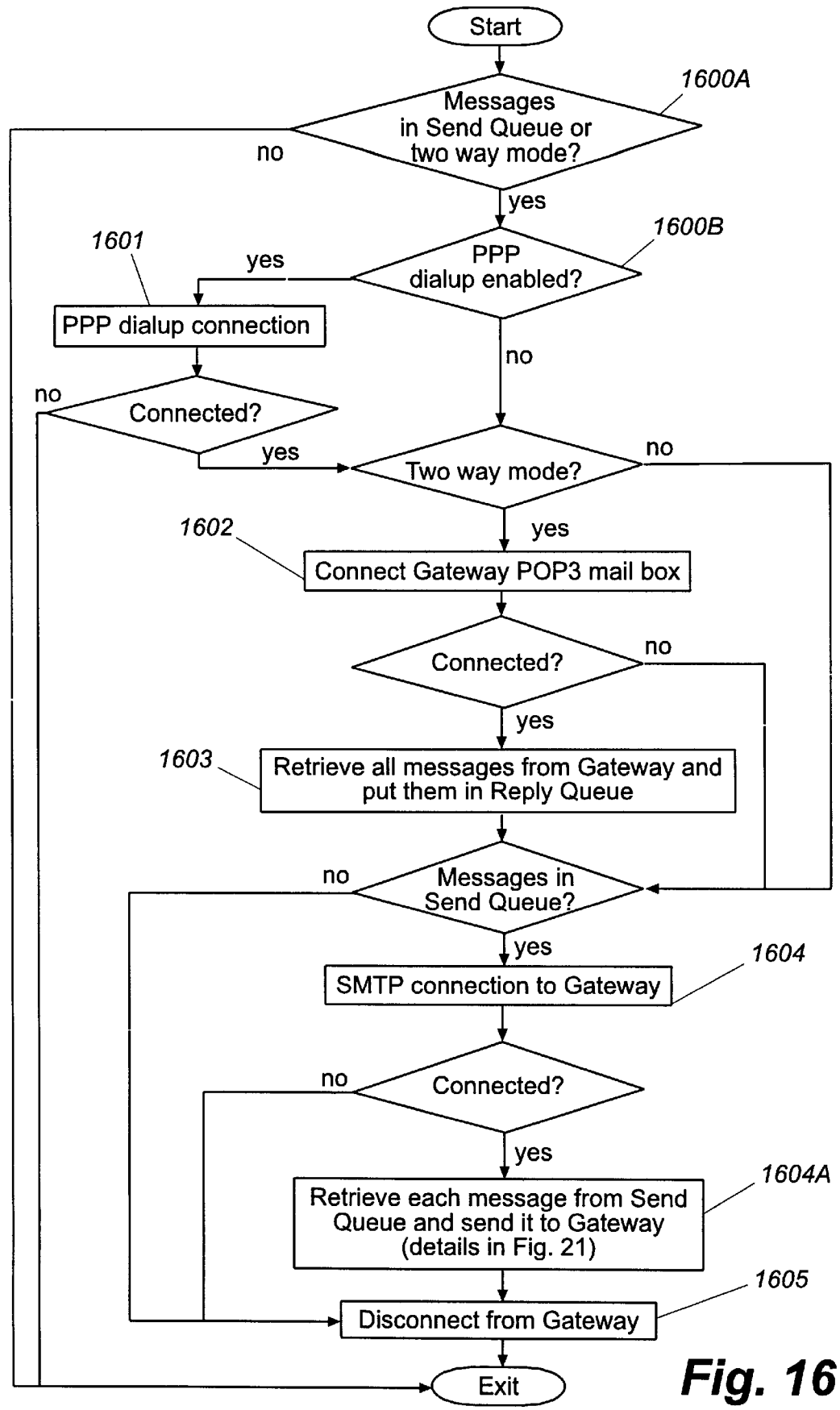

FIG. 16 depicts the process performed by step 1405A, described above with respect to FIG. 14.

[1600A]

[1600B]

[1601] If there are messages in the Send Queue or two-way mode, and PPP dialup is enabled, then do the PPP dial up.

[1602] Try to connect to the POP3 mailbox 204C at the gateway 101.

[1603] Retrieve all messages from the POP3 mailbox 204C at the gateway 101 and put them into the Reply Queue.

[1604] Try to connect to the gateway 101 using SMTP protocol.

[1604A] Retrieve each message from Send Queue and send it to the gateway 101. This step is described in further detail with respect to FIG. 21.

[1605] Disconnect from the gateway 101.

Figure 17:
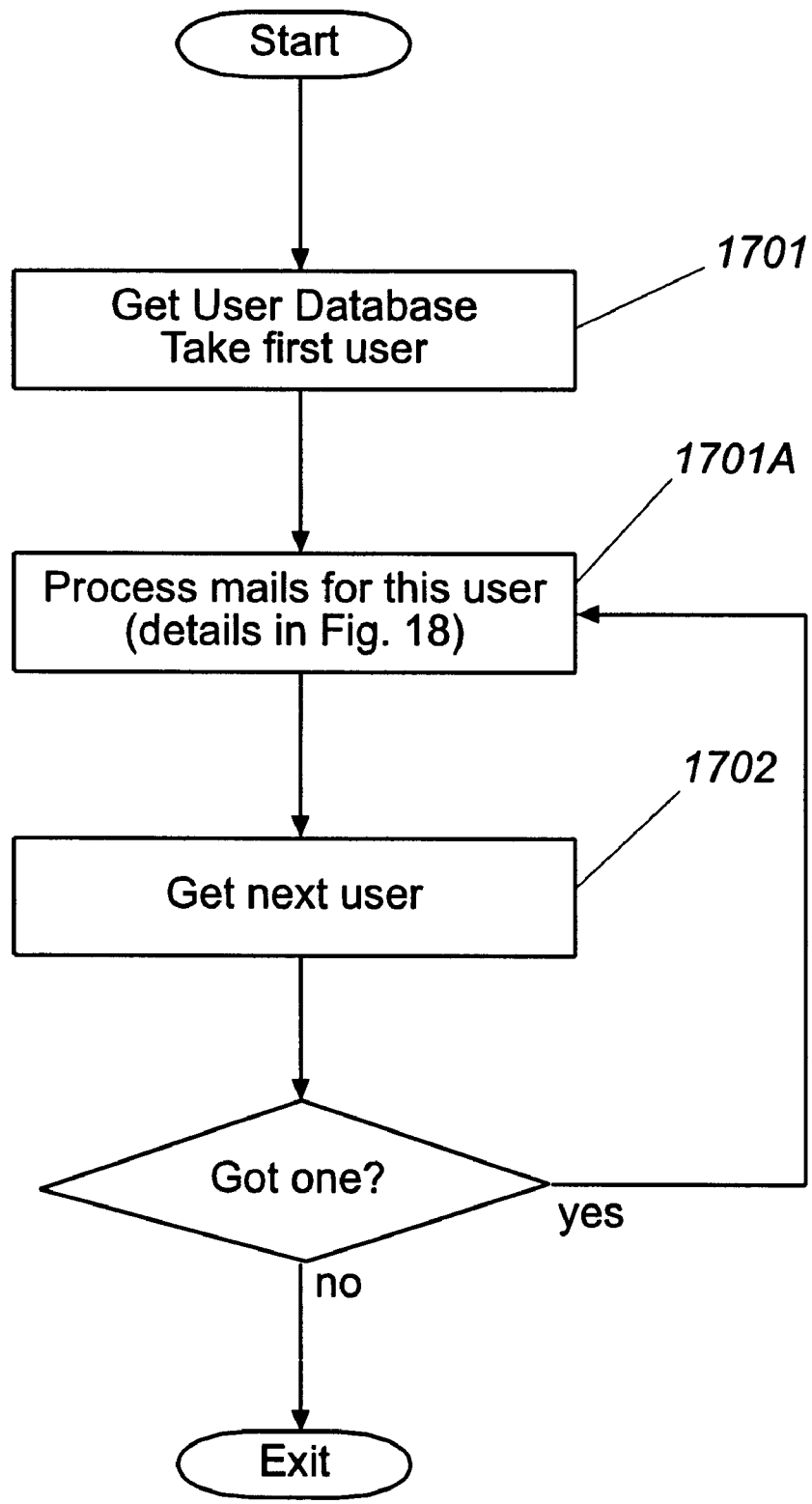

FIG. 17 depicts the process performed by step 1406A, described above with respect to FIG. 14.

[1701] Get the user database and take the first user.

[1701A] Process mail for this user. This step is described in further detail with respect to FIG. 18.

[1702] Get the next user.

Figure 18:
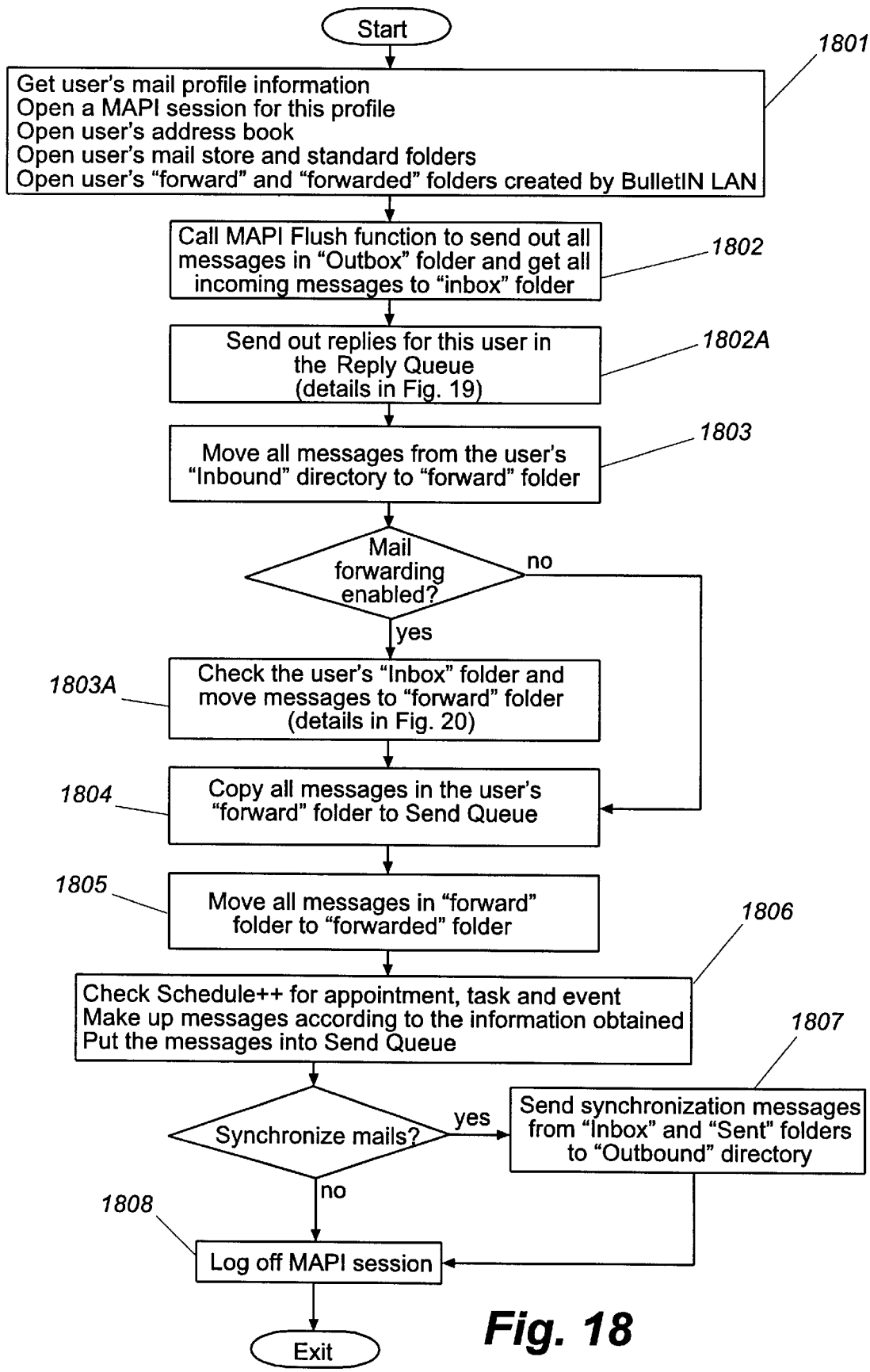

FIG. 18 depicts the process performed by step 1701 A, described above with respect to FIG. 17.

[1801] Start a MAPI session for the user. Open a MAPI session by means of the user's mail profile; open the user's address book, open the user's mail store and all standard mail folders, and open the "forward" and the "forwarded" folders created by the LAN Access Server 125 for the user.

[1802] Call the MAPI Flush function to send out all messages in the "Outbox" folder and get all incoming messages to the "Inbox" folder.

[1802A] Send out replies for this user in the Reply Queue. This step is described in further detail with respect to FIG. 19.

[1803] Move all messages from the user's "InBound" directory to the "forward" folder.

[1803A] Check the user's "Inbox" folder and move messages to "forward" folder. This step is described in further detail with respect to FIG. 20.

[1804] Copy all messages in the user's "forward" folder to Send Queue.

[1805] Move all messages in the "forward" folder to "forwarded" folder.

[1806] Check Schedule+ (or equivalent calendaring and appointment software package) for occurrences of appointment, task and event. Create messages according to the information obtained and put the messages in the Send Queue.

[1807] Send synchronization messages from the user's "Inbox" and "Sent" folders to the "OutBound" directory.

[1808] Logoff from the MAPI session.

Figure 19:
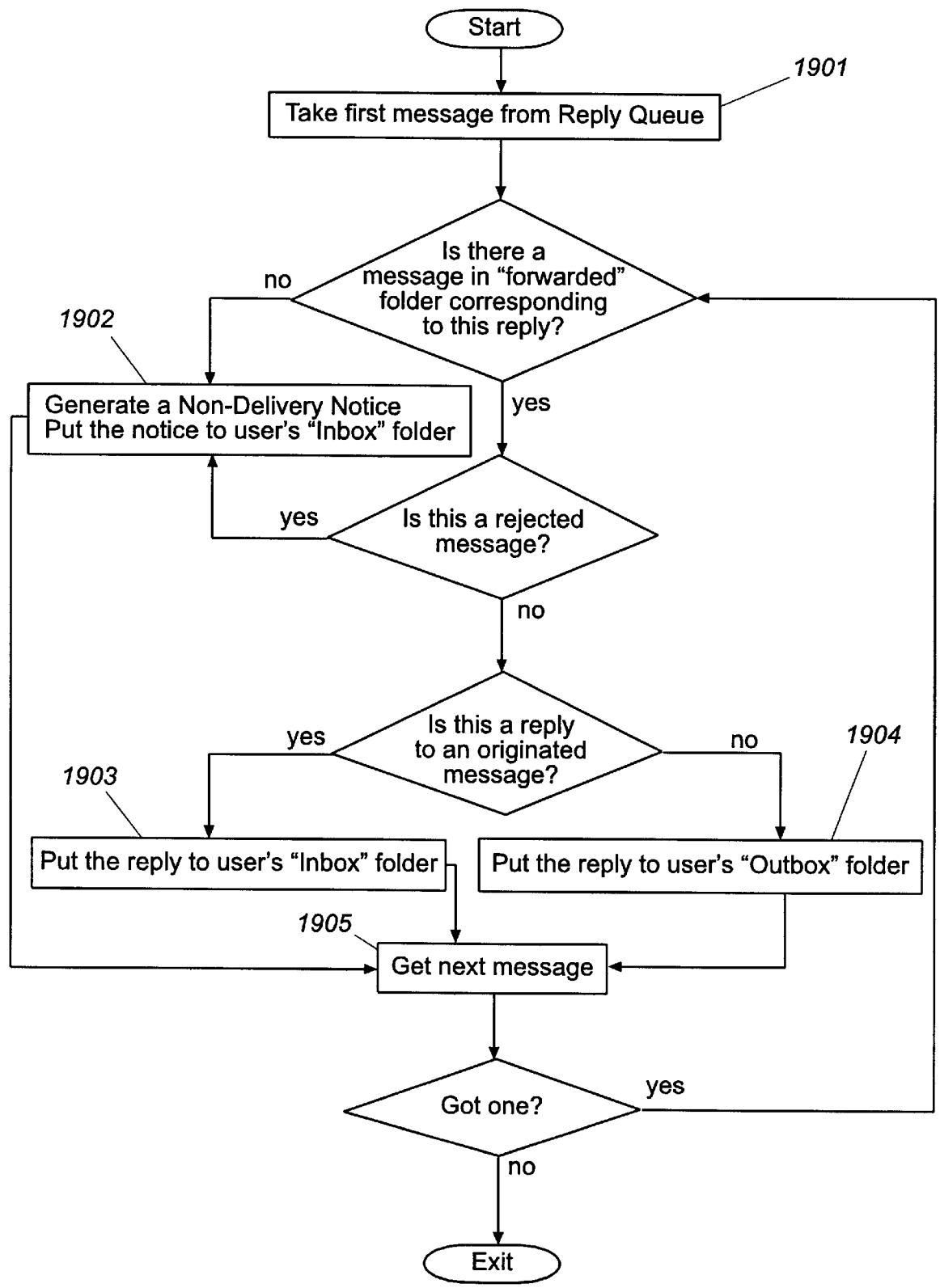

FIG. 19 depicts the process performed by step 1802A, described above with respect to FIG. 18.

[1901] Take the first message from the Reply Queue

[1902] If there is not a message in the "forwarded" folder corresponding to this reply, or if there is then if this is a rejected message, then generate a Non-Delivery Notice for the message and put the notice into the user's "Inbox" folder.

[1903] If this is a reply to an originated message, then put the reply into the user's "Inbox" folder.

[1904] Otherwise, put the reply into the user's "Outbox" folder.

[1905] Get next message.

Figure 20:
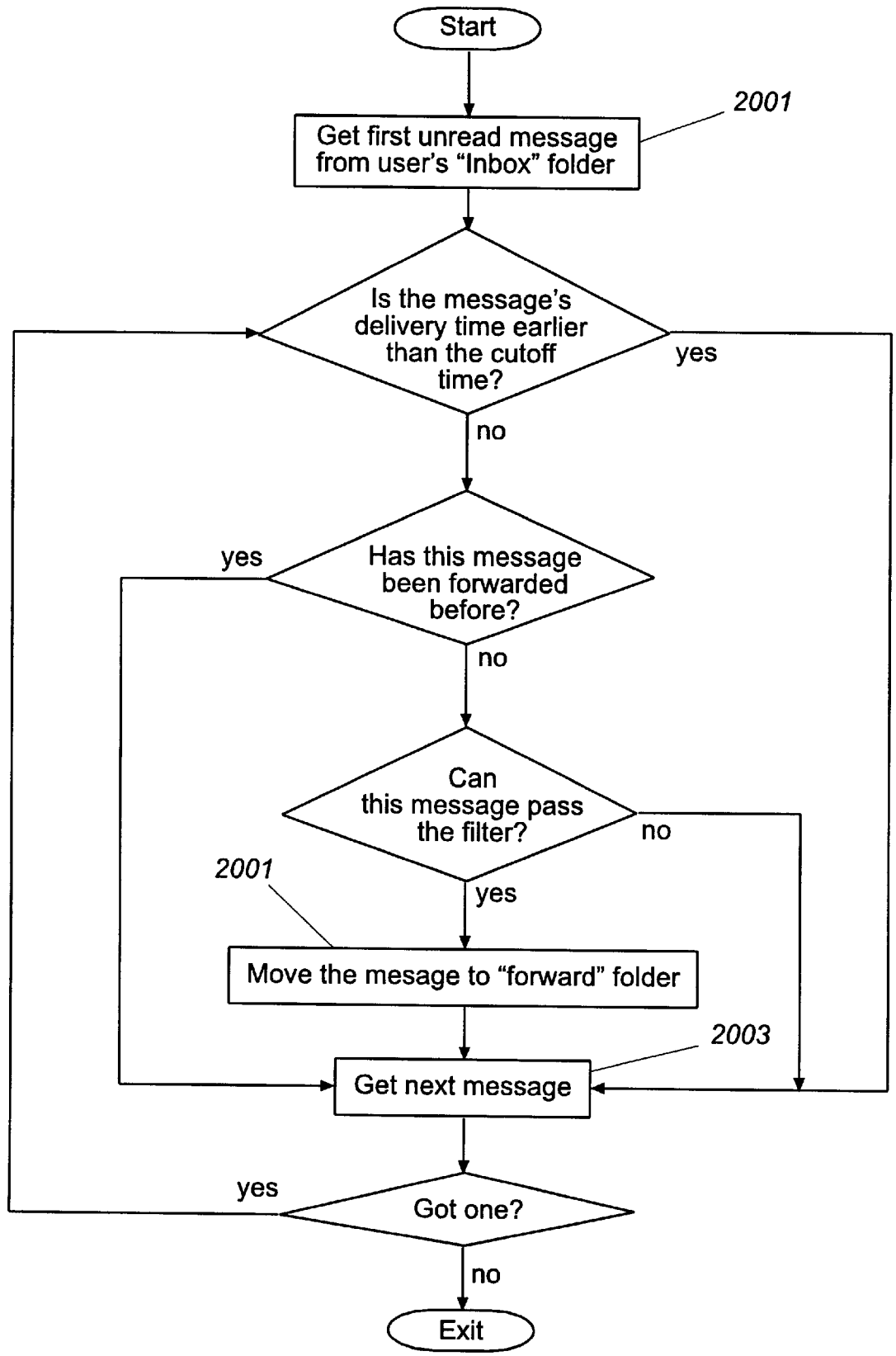

FIG. 20 depicts the process performed by step 1803A, described above with respect to FIG. 18.

[2001] Get the first unread message from the user's "Inbox" folder.

[2002] If the message's delivery time is not earlier than the cutoff time, and the message has not been forwarded before and the messages passes the filter, then move the message to the "forward" folder.

[2003] Get the next message.

Figure 21:
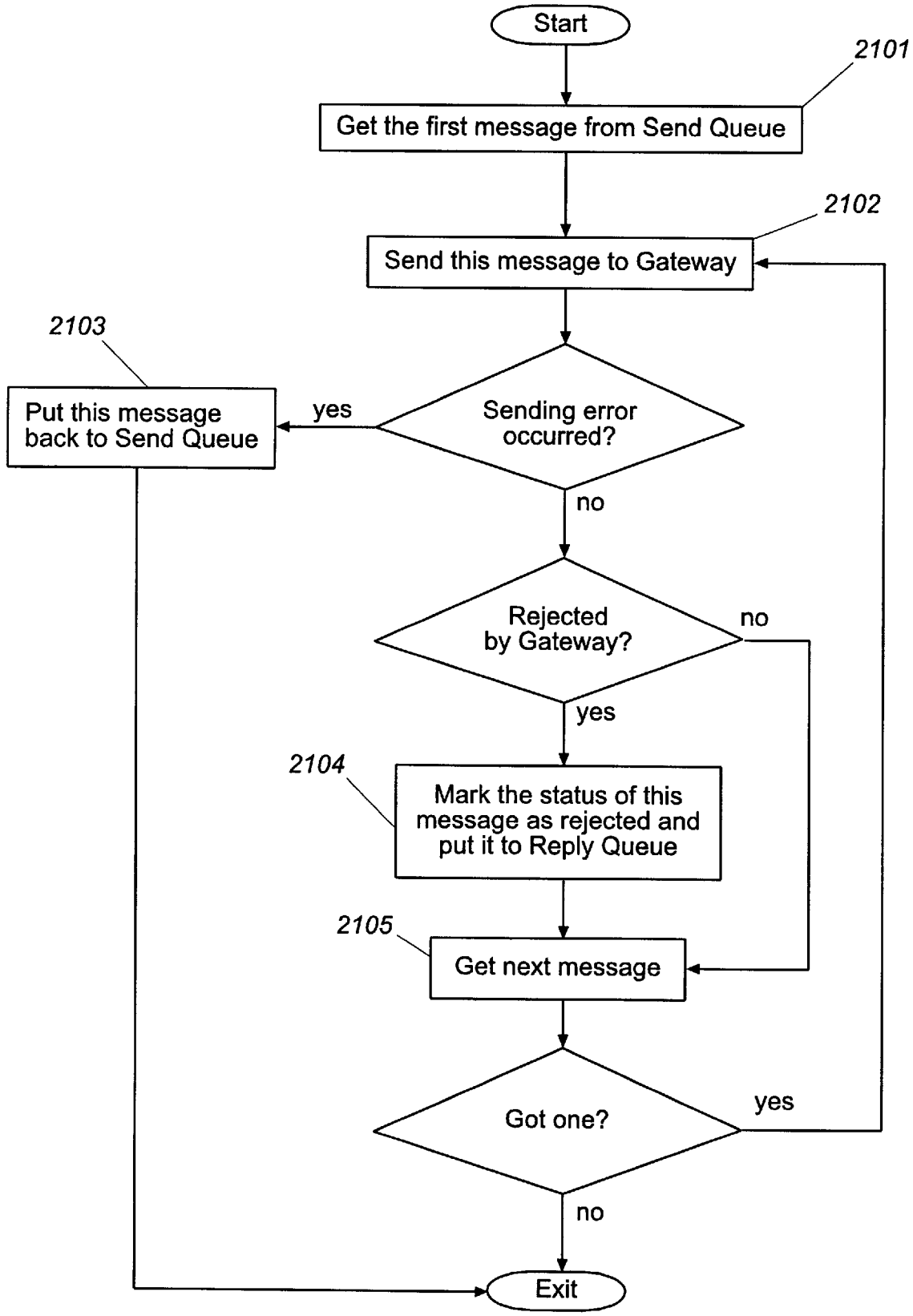

FIG. 21 depicts the process performed by step 1604A, described above with respect to FIG. 16.

[2101] Get the first message from the Send Queue.

[2102] Send this message to gateway 101.

[2103] Put the message back into the Send Queue.

[2104] If no sending error occurred but the message is rejected by the gateway 101, then mark the status of the message as rejected and put it to the Reply Queue.

[2105] Get the next message.

The present invention has been described previously in a preferred embodiment. It will be understood by those having ordinary skill in the art that the present invention may be implemented in a variety of ways, while still remaining within the scope of the claims set forth below.

What is claimed is:

1. A messaging system comprising:
   (a) a wireless communication device;
   (b) means for originating an electronic message including:
      (i) a destination address, in a first format, associated with the wireless communication device; and
      (ii) a reply address, in a second format, associated with the originating means;
   (c) means for performing the steps of:
      (i) receiving the electronic message from the originating means;
      (ii) creating a temporary reply address, in the first format, associated with the reply address of the electronic message;
      (iii) forwarding a modified electronic message to the wireless communication device via a selected communication connection, wherein the modified electronic message includes as a reply address the temporary reply address;
      (iv) receiving from the wireless communication device via the selected communication connection a reply electronic message including the temporary reply address; and
      (v) forwarding the reply electronic message to the originating means whose reply address is associated with the temporary reply address.

2. The messaging system of claim 1, wherein the wireless communication device comprises a digital mobile phone.

3. The messaging system of claim 1, wherein the originating means comprises a client/server system.

4. The messaging system of claim 1, wherein the originating means comprises a mail server on the Internet.

5. The messaging system of claim 1, wherein the first format corresponds to an MSISDN address.

6. The messaging system of claim 1, wherein the second format corresponds to an Internet address.

7. A messaging process for use with a wireless communication device, comprising the steps of:
   (a) originating an electronic message including:
      (i) a destination address, in a first format, associated with the wireless communication device; and
      (ii) a reply address, in a second format, associated with the originating means;
   (b) creating a temporary reply address, in the first format, associated with the reply address of the electronic message;
   (c) forwarding a modified electronic message to the wireless communication device via a selected communication connection, wherein the modified electronic message includes as a reply address the temporary reply address;
   (d) receiving from the wireless communication device via the selected communication connection a reply electronic message including the temporary reply address; and
   (e) forwarding the reply electronic message to the reply address associated with the temporary reply address.

* * * * *

UNITED STATES PATENT AND TRADEMARK OFFICE
Certificate

Patent No. 6,134,432

Patented: October 17, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Rob Munro, Auckland, (NZ).

Signed and Sealed this Twenty-First Day of August 2012.

MATTHEW D. ANDERSON
*Supervisory Patent Examiner*
Art Unit 2618
Technology Center 2600